(12) United States Patent
Becker et al.

(10) Patent No.: US 7,499,473 B2
(45) Date of Patent: Mar. 3, 2009

(54) METHOD AND DEVICE FOR SYNCHRONIZING A MOBILE RADIO RECEIVER

(75) Inventors: Burkhard Becker, Ismaning (DE); Thuyen Le, Schönaich (DE); Steffen Paul, Baierbrunn (DE); Thomas Ruprich, München (DE)

(73) Assignee: Infineon Technologies AG, Munich (DE)

( * ) Notice: Subject to any disclaimer, the term of this patent is extended or adjusted under 35 U.S.C. 154(b) by 679 days.

(21) Appl. No.: 11/076,210

(22) Filed: Mar. 9, 2005

(65) Prior Publication Data

US 2005/0207393 A1    Sep. 22, 2005

Related U.S. Application Data

(63) Continuation of application No. PCT/DE03/02679, filed on Aug. 8, 2003.

(30) Foreign Application Priority Data

Sep. 9, 2002  (DE) ............................... 102 41 675

(51) Int. Cl.
*H04J 3/06* (2006.01)
(52) U.S. Cl. ...................... 370/509; 370/337; 370/347; 375/152
(58) Field of Classification Search ................ 370/509, 370/337, 347; 375/152
See application file for complete search history.

(56) References Cited

U.S. PATENT DOCUMENTS

| 5,724,384 A | 3/1998 | Kim et al. |
| 5,883,929 A | 3/1999 | Wang et al. |
| 6,404,758 B1 * | 6/2002 | Wang ........................ 370/342 |

(Continued)

FOREIGN PATENT DOCUMENTS

DE    197 11 057 A1    11/1997

(Continued)

OTHER PUBLICATIONS

"Direct Sequence Spread Spectrum Matched Filter Acquisition in Frequency-Selective Reyleight Fading Channels", Brima B. Ibrahim and Humid Aghvami, IEEE Journal of Selected Areas in Communications, vol. 12, No. 5, Jun. 1994, 5 pgs.

(Continued)

*Primary Examiner*—Duc C Ho
(74) *Attorney, Agent, or Firm*—Eschweiler & Associates, LLC

(57) ABSTRACT

A method for synchronization of a mobile radio receiver having a time slot structure for a radio signal is disclosed. A data stream received by the mobile radio receiver is filtered in a filter, thereby producing a decision sequence of received data as a set of maximum possible determined time slot boundaries. The decision sequence is processed in a two-step method such that, in a first method step, a subset is selected from the decision sequence and, then, in a second method step, the elements of said subset are averaged over time, with the time slot boundary which is used for synchronization being obtained as the result of this averaging process. In this case, the subset is selected using statistical characteristics of those signal sample values that are associated with a time slot boundary, and of those signal sample values which are not associated with a time slot boundary.

32 Claims, 10 Drawing Sheets

U.S. PATENT DOCUMENTS

| | | | |
|---|---|---|---|
| 6,775,318 B2 * | 8/2004 | Chen et al. | 375/149 |
| 2002/0122407 A1 * | 9/2002 | Molnar et al. | 370/347 |
| 2005/0207393 A1 | 9/2005 | Becker et al. | |

FOREIGN PATENT DOCUMENTS

| | | |
|---|---|---|
| DE | 199 61 557 A1 | 7/2001 |
| EP | 0 654 913 A2 | 5/1995 |
| EP | 0 804 002 A1 | 10/1997 |
| EP | 804002 A1 | 10/1997 |
| EP | 0 852 430 A2 | 7/1998 |
| EP | 1 035 665 A1 | 9/2000 |
| EP | 1035665 A1 | 9/2000 |
| WO | WO 00/44117 A2 | 7/2000 |
| WO | WO 01/01596 A1 | 1/2001 |

OTHER PUBLICATIONS

Chapter 2 "Probability and Stochastic Processes", *Digital Communications* $3^{rd}$ *Edition*, J. G. Proakis, 1995, pp. 43 and 45.

International Search Report, Int'l. Application No. PCT/DE03/02679, Int'l. Filing Date Aug. 8, 2003.

"A Multi-Purpose Threshold Detector for Mobile Radio Application", R. Olivier, E. Le Strat and C. Mourot, Vehicular Technology Conference, 1994, IEEE $44^{th}$ Stockholm, Sweden, Jun. 8-10, 1994, New York, N.Y., IEEE, Jun. 8, 1994, pp. 1268-1271.

"Spread-Spectrum Signal Acquisition: Methods and Technology", Stephen S. Rappaport and Donald M. Grieco, IEEE Communications Magazine, IEEE Service Center, Piscataway, J.J., vol. 22, No. 6, Jun. 1, 1984, pp. 6-21.

3GPP TS 25.211. V4.4.0 (Mar. 2002), $3^{rd}$ Generation Partnership Project; Technical Specification Group Radio Access Network; Physical Channels and Mapping of Transport Channels onto Physical Channels (FDD) (Release 4), 46 pgs.

International Search Report, Int'l Application No. PCT/DE03/02680, Int'l Filing Date Aug. 8, 2003, 3 pgs.

U.S. Appl. No. 11/076,141, filed Mar. 9, 2005, Ruprich et al.

Digital Communications, Third Edition, 1995, Chapter 2: Probability and Stochastic Processes, p. 43, 45.

Office Action dated Sep. 17, 2007 for U.S. Appl. No. 11/076,141.

Response dated Dec. 12, 2007 for U.S. Appl. No. 11/076,141.

Final Office Action dated Apr. 7, 2008 for U.S. Appl. No. 11/076,141.

* cited by examiner

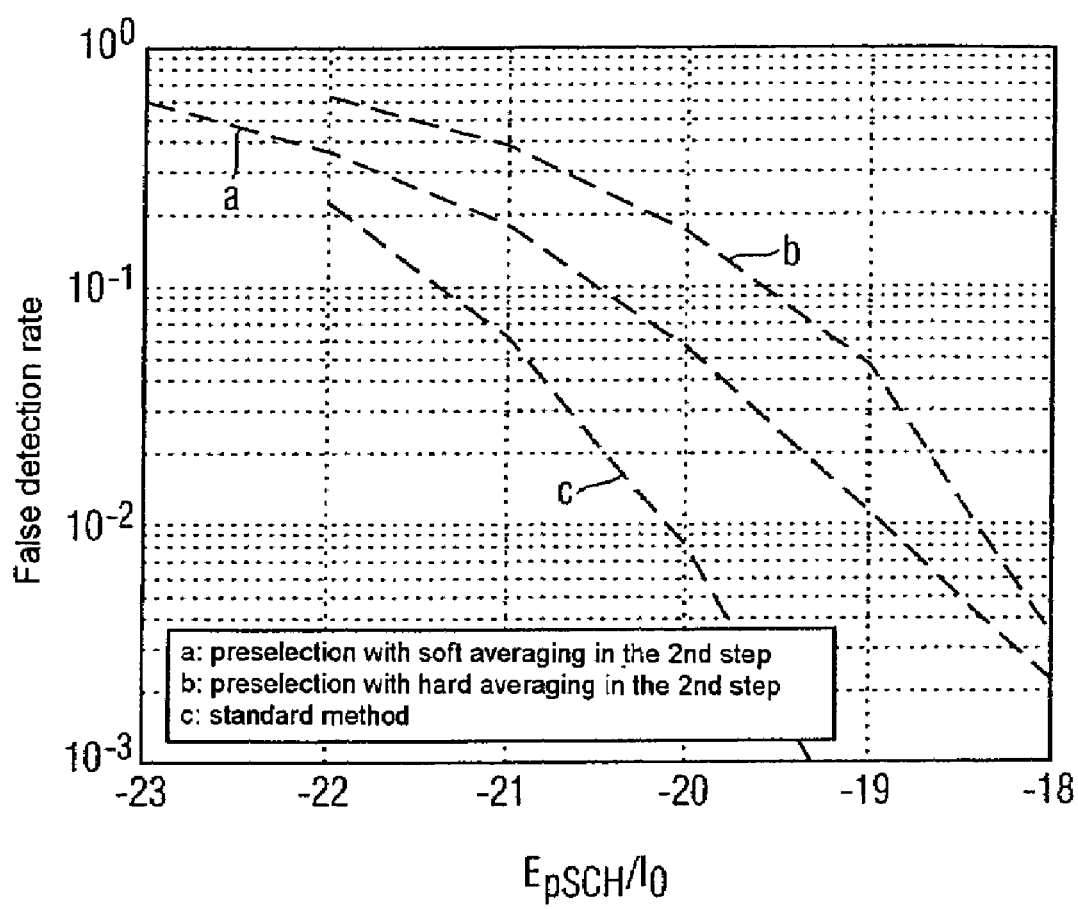

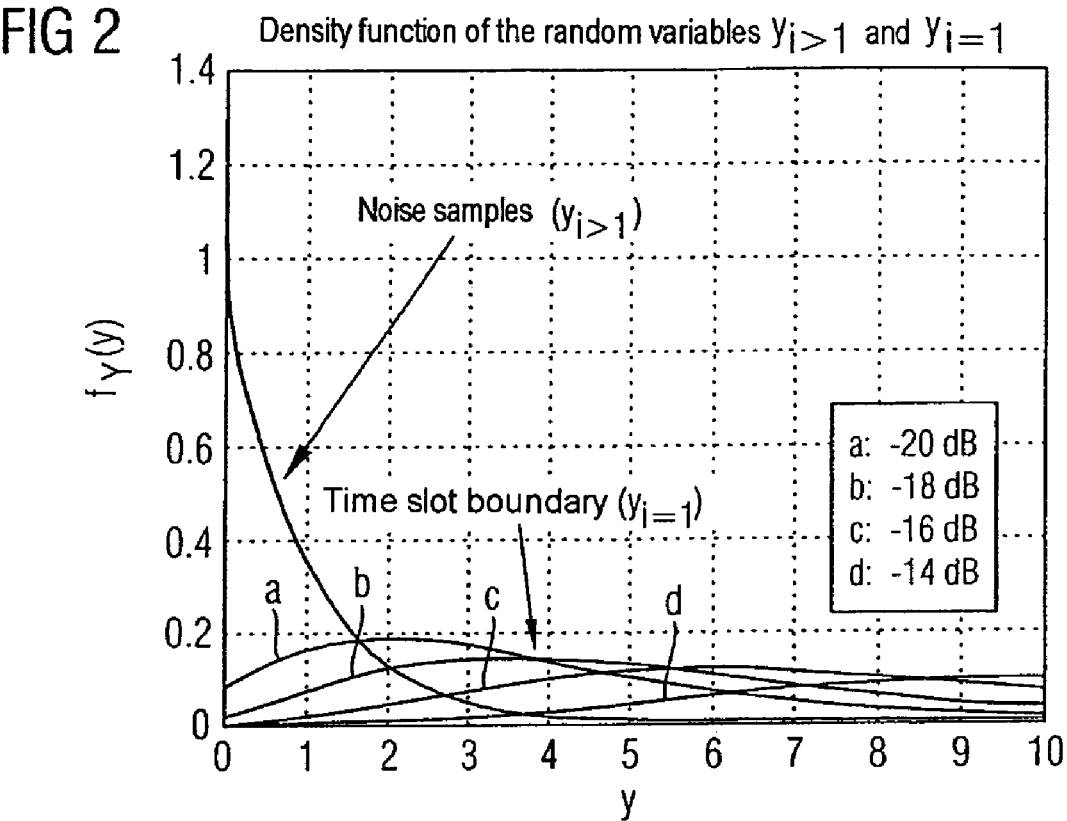
FIG 2 Density function of the random variables $y_{i>1}$ and $y_{i=1}$
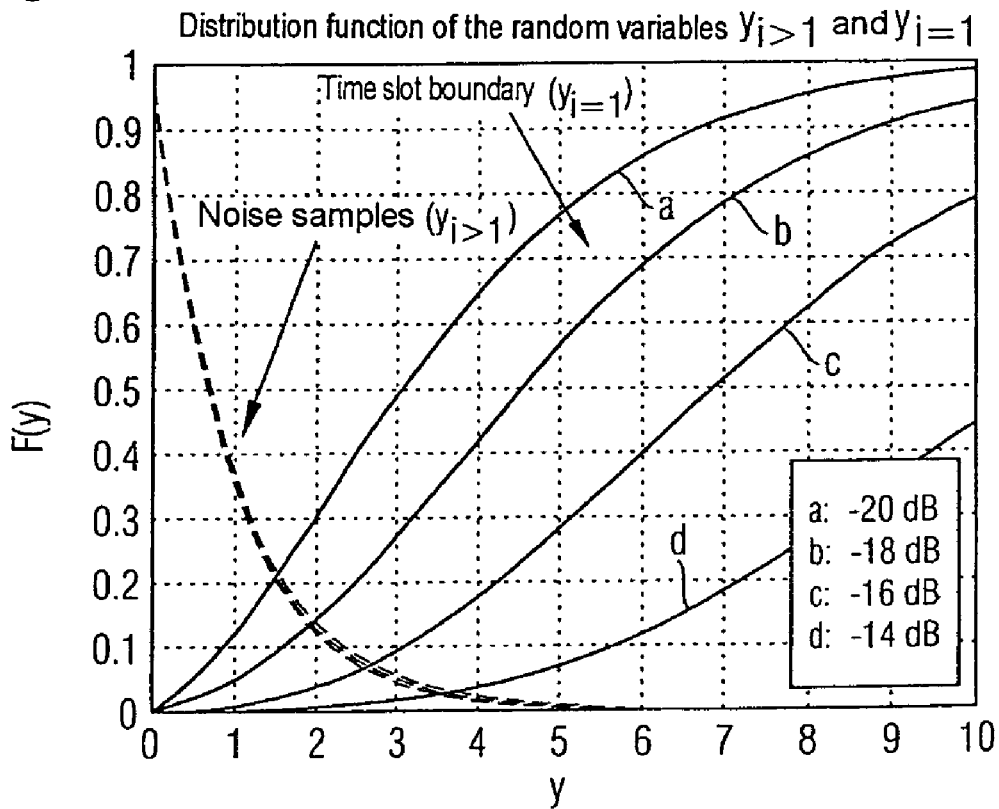
FIG 3 Distribution function of the random variables $y_{i>1}$ and $y_{i=1}$

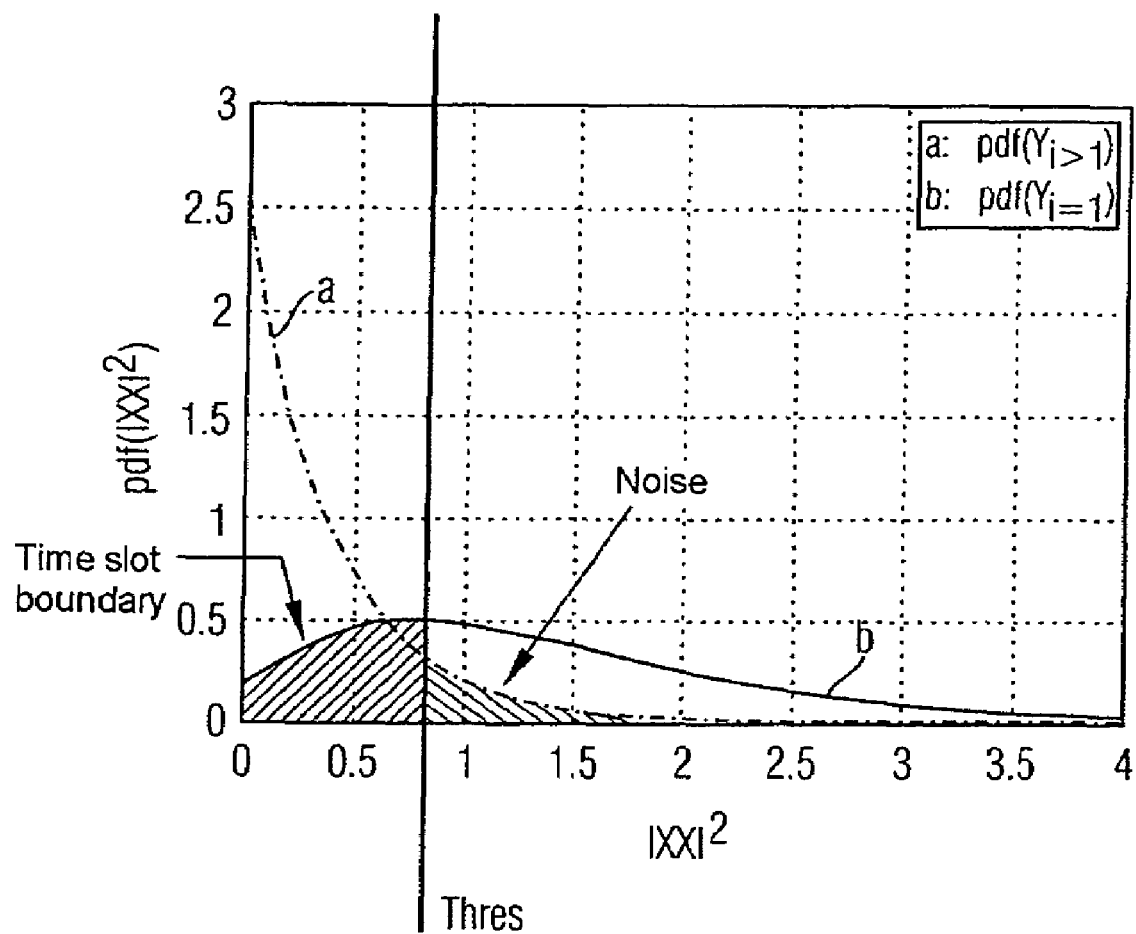

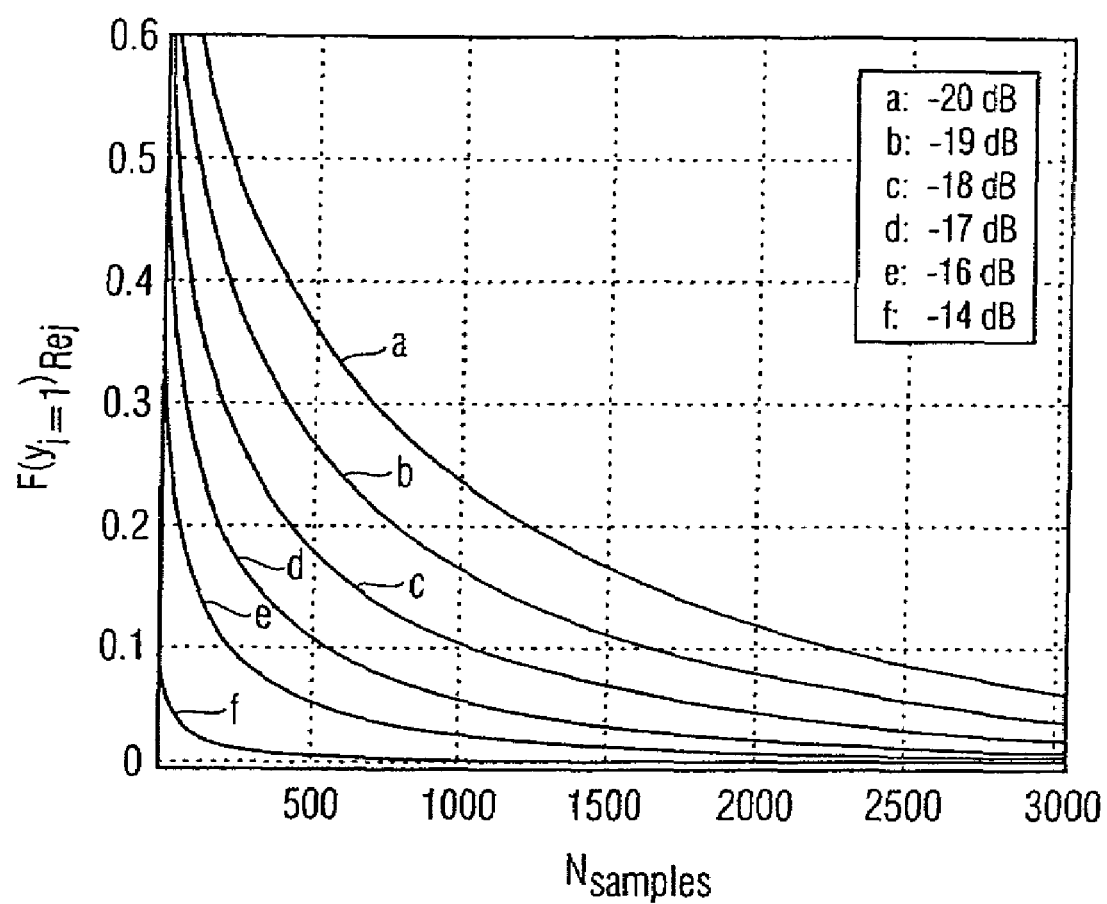

Error detection probability of the 2nd step plotted against Thres2 for maximum peak selection falling $E_C/I_0$ (-20 dB : 1 dB : -16 dB)

Error detection probability of the 2nd step plotted against Thres2 for maximum peak selection a: -22 dB
b: -21 dB
c: -20 dB
d: -19 dB
e: -18 dB
f: -16 dB Density function of the random variables $y_{i>1}$ and $y_{i=1}$ for N>1 averaging processes a: −20 dB
b: −18 dB
c: −16 dB
d: −14 dB Distribution function of the random variables $y_{i>1}$ and $y_{i=1}$ for N>1 averaging processes a: $1-F(Y_{i>1})$
b: $F(Y_{i=1})$ Thres2

METHOD AND DEVICE FOR SYNCHRONIZING A MOBILE RADIO RECEIVER

REFERENCE TO RELATED APPLICATIONS

This application is a continuation of PCT/DE03/02679, which was not published in English, which claims the benefit of the priority date of German Patent Application No. DE 102 41 675.3, filed on Sep. 9, 2002, the contents of which both are herein incorporated by reference in their entireties.

FIELD OF THE INVENTION

The invention relates to a method and a device for synchronization of a mobile radio receiver, with a radio signal, which is received from a base station, having a time slot structure and, in particular, a frame structure.

BACKGROUND OF THE INVENTION

A two-step prior art synchronization method of the generic type is known from DE 199 61 557 A1.

Before setting up a data link to one or more base stations, every mobile radio receiver must synchronize itself to a transmission and reception clock. For this purpose, the base station generally periodically transmits a specific signal, which comprises a predetermined sequence of chips, is known to the receiver and is referred to in the following text as a "sync word" or as a time slot synchronization code. This signal is looked for in the incoming data stream in the receiver. This procedure is carried out automatically in the mobile radio receiver, on the basis of the software programming of its hardware structure.

The data stream is subdivided into so-called time slots (or slots) with a fixed number of bits. At the start of a time slot such as this, there is a sync word, which must be identified by means of a suitable method. Furthermore, a specific number of successive time slots in the data stream are combined to form a frame.

Two different solution approaches are known from the prior art for identification of the time slot start.

In the first solution approach that is known from the prior art, the received signal is correlated with a sync word. To do this, the received data bits (corresponding to the length of the sync word) are taken from after a specific time, and a correlation with the sync word is carried out. The result is stored. This process is repeated until all of the potentially possible time slot starts in a time slot have been tested. The time with the maximum correlation value then corresponds to the time slot start.

In a second solution that is known from the prior art, the received data stream is filtered by means of a matched filter (FIR filter). The impulse response of this filter corresponds to the complex-conjugate sync word, mirrored in the time domain. The matched filter produces a result for each received bit. The maximum value at the filter output occurs when the time slot start has been found (minus the latency of the filter). This solution is described, for example, in: B. B. Ibrahim, H. Aghvami; IEEE Journal on Selected Areas in Communications; Vol. 12, No. 5; June 1994.

Since the mobile radio channel is not a steady-state channel, it is not sufficient to carry out the methods described above for only a single time slot. Typically, a number of time slots must be processed in order to come to a virtually error-free decision about the time slot boundary. In consequence, it is necessary to store all of the intermediate results. In a CDMA (Code Division Multiple Access) system, as is used for UMTS, the time slot length corresponds to 2560 samples (in each case with an in-phase component and a quadrature component), or to a multiple of this, if oversampling is carried out. An oversampling factor of 2 is normally used. Up to 10,240 samples, each typically comprising 8 bits, are thus stored. A corresponding RAM of 80 kbits would thus have to be provided.

The last-mentioned approach, in which averaging is carried out over all 2560 signal sample values multiplied by the oversampling factor OSF, is the standard approach used in the prior art to solve the time slot synchronization problem.

The standard synchronization method which is known from the prior art and whose result is very accurate has the disadvantage, however, that the amount of memory space required is very large and the power consumption is very high (computation operations). The two-step method which is known from DE 199 61 557 A1 filters the received data by means of a grid of a number of windows with the same rigid width and selection of the window with the greatest recorded energy in the first processing step reduces the amount of memory space required, but this prior art solution is at the expense of a considerable reduction in the recording accuracy. The reason for the poor accuracy of the method according to DE 199 61 557 A1 is that this method does not distinguish between information energy and disturbance energy in the first method step, so that, even if the disturbance level is low, a window which currently does not contain the sought time slot boundary, that is required for synchronization, is relatively frequently selected in the first method step for further processing.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is directed to a method for time slot synchronization and, in particular, also for frame synchronization of a mobile radio receiver to a base station, which consumes less power and requires less memory space than the standard method which is known from the prior art, and which nevertheless produces good recording and synchronization results within a time period that is specified by the system. A further aim is to specify a device for carrying out the synchronization method.

The method according to the invention comprises a two-step method, in which a subset from the set of all the signal sample data is preselected in the first method step. Since the complete procedure as far as identification of the time slot boundary which is required for synchronization need not be carried out using the entire set of signal sample data, this results in a considerable reduction in the amount of memory space required in comparison to the standard method which is known from the prior art.

In contrast to the method according to DE 199 61 557 A1, which likewise saves memory space, but in which only a fixed cohesive section within the time slot may be selected for further processing in the first method step, the method according to the invention is based on the idea that the indices of the elements of the subset which is selected in the first method step may be located at any point in the time slot, in which case the decision criteria that are used in each case are always critical for the implementation of a specific index selection. The fundamental improvement in the flexibility of the subset selection, as has just been mentioned, in the first method step and taking into account the statistical characteristics of the signal sample values in the preselection decision results in the two-step time slot synchronization method according to the invention being more accurate than the two-step time slot synchronization method which is known from DE 199 61 557 A1. This is particularly important when it is remembered that a certain disturbance level can never be completely avoided in mobile radio communication use.

The synchronization method according to the invention solves the synchronization problem described above by means of two step elements. In a first (pre)processing step, a subset is selected from the maximum possible time slot starts. In general, it is sufficient to process one time slot in order to carry out the preprocessing step. However, the detection probability can be improved by processing two or more time slots. Since only one subset needs to be temporarily stored for further processing this saves a considerable amount of memory space, as already mentioned above, in comparison to the standard method that is known from the prior art.

In the method according to the invention, the subset of signal sample values is preselected in the first method step by means of a suitable approach using known information, which in all cases includes the statistics relating to the slot boundary signal. It is also possible to use the statistics relating to the disturbance signal, information about the received overall spectrum (RX overall spectrum), and the intended detection power, that is to say the desired minimum power to be detected on a path.

The second processing step carries out an averaging process on the received values for the subset that was selected in the first step. This results in the required memory being M×16 bits, where M corresponds to the number of elements selected in the preprocessing step. A typical value of M=1400 results in a memory requirement of approximately 22 kbits. This represents a reduction of around 75% in comparison to the memory space requirement needed in the standard method according to the prior art.

It should also be noted that the power losses are comparatively moderate, being approximately 1 dB for soft averaging and approximately 2 dB for hard averaging, for a false detection probability of $10^{-1}$. FIG. 1 shows the power for exemplary embodiments of two embodiments of the invention, in comparison to the standard method that is known from the prior art. The false detection rate is plotted on the ordinate of the diagram shown in FIG. 1. The abscissa shows the ratio of the received energy per PN chip on the primary synchronization channel $E_{pSCH_c}$ to the total received power $I_0$.

A further advantage of the method according to the invention is that the RAM that is used already by the frame synchronization unit in a mobile radio receiver has the capacity required by the proposed method, so that it can thus be used directly. There is therefore no need for any additional RAM for time slot synchronization.

A further aspect of the invention relates to a method by means of which the mobile radio receiver can be synchronized to a frame structure of a radio signal received from the base station. This is done by finding at least one specific frame boundary, with the time slot boundaries in the radio signal having already been determined using the method according to the invention. In a first method step, a data stream that is received by the mobile radio receiver is filtered in a filter taking into account the previously determined time slot boundaries. As a result of this after filtering, the filter produces a predetermined number of values for each time slot boundary. In a second method step, the frame boundary that is used for synchronization is calculated from the values.

The values in the filter are advantageously produced by correlation between the data stream received by the mobile radio receiver and a basic sequence on which the known frame synchronization codes are all based. These correlation processes preferably begin at the start of a time slot.

One embodiment of the invention provides that in the second method step, the values for each time slot boundary are processed by means of a fast Hadamard transformation, and that the frame boundary is calculated from the results of the fast Hadamard transformation.

It is also advantageous in one example for the results of the fast Hadamard transformations for each time slot to be averaged over a number of frame lengths before calculation of the frame boundary.

The device according to the invention is used to carry out the method according to the invention for time slot synchronization and, in particular, also for carrying out the method for frame synchronization according to the invention. For this purpose, the device has a filter for filtering the data stream received by the mobile radio receiver, a first rewritable memory, and a second rewritable memory.

The received data in the decision sequence or the data produced for time slot synchronization in the second method step of the method or—when using the device according to the invention for the frame synchronization method—the data produced in the second method step of the method for frame synchronization is temporarily stored at one time in the first rewritable memory. This means that, when the data described above is temporarily stored in the first rewritable memory, any data that may previously have been stored there is overwritten.

The data produced in the first method step of the method for time slot synchronization and, in particular, the data produced in the first method step of the method for frame synchronization are temporarily stored at one time in the second rewritable memory.

The device according to one example of the invention is optimally matched to the requirements of the methods according to the invention for time slot synchronization and frame synchronization, so that the device according to the invention allows the synchronization tasks to be carried out efficiently with only a small power consumption and a small area requirement. Furthermore, the device according to the invention makes it possible to comply with the requirements specified by the UMTS Standard.

A further advantage of the device according to the invention is that it can be used both for the time slot synchronization method and for the frame synchronization method. Many of the hardware components in the device according to the invention are in this case used for both methods. Thus, overall, fewer hardware components are required than if a dedicated device were to be provided in each case for carrying out the time slot synchronization and the frame synchronization, respectively.

The components of the device according to the invention, in particular the first and the second rewritable memory, are of sizes which can be scaled depending on the requirements of the synchronization methods, for example with regard to memory sizes or word lengths, and they can thus be used in a flexible manner.

In one example, the filter comprises a correlator unit or a matched filter for correlation between a received synchronization code and a known synchronization code.

One exemplary embodiment of the invention provides a unit for selection of the subset ($Y_{sub}$) from the decision sequence produced during the time slot synchronization. This unit advantageously contains a threshold value decision maker, an incrementer and, in particular, a unit for calculation of statistical variables.

A further embodiment of the invention includes a peak detection unit for determination of the data items from a data set that overshoot an adjustable threshold value. The peak detection unit is advantageously followed by a third rewritable memory, in which the results determined by the peak detection unit are stored.

The device according to another embodiment of the invention furthermore contains a unit for carrying out fast Hadamard transformations, which is arranged following the second rewritable memory. This unit may be followed by a further unit, by means of which the base station transmitting the radio signal is identified, and the frame boundary is determined, from the results of the fast Hadamard transformations. These results may, for example, be stored in a fourth rewritable memory.

A control unit is preferably implemented in the device according to one example of the invention in order to control the filter, the first and the second rewritable memory and, if appropriate, for controlling further units. The control unit may be, in one example, a digital signal processor, which allows flexible programming, control and monitoring of the device according to the invention.

According to one exemplary embodiment of the invention, the rewritable memories are each duplicated. This is advantageous in the event of an interrupt in a synchronization process, since the synchronization process can be continued again after the interrupt by virtue of the duplication of the memories, and need not be restarted. Although it is possible to provide for the first and the second rewritable memory to be substantially physically separated from one another, it is advantageously possible in one example to provide for them to be integrated in a common memory.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Advantageous and preferred exemplary embodiments of the method according to the invention will be explained in the following text with reference to figures, in which:

FIG. 1 is a graph illustrating the relationship between the false detection rate and the ratio of the received energy per PN chip of the primary synchronization channel $E_{pSCH_c}$ to the total received power $I_0$ for two exemplary embodiments of a method according to the invention, in comparison to the standard synchronization method that is known from the prior art;

FIG. 2 is a graph illustrating density functions of random variables for time slot boundaries and for noise samples;

FIG. 3 is a graph illustrating distribution functions of random variables for time slot boundaries and noise samples;

FIG. 4 is a graph illustrating effects of threshold value location in a first step of one exemplary embodiment of the method according to the invention;

FIG. 5 is a graph illustrating solutions for a probability equation for various values of M and $\sigma^2$;

DETAILED DESCRIPTION OF THE INVENTION

Figure 6:
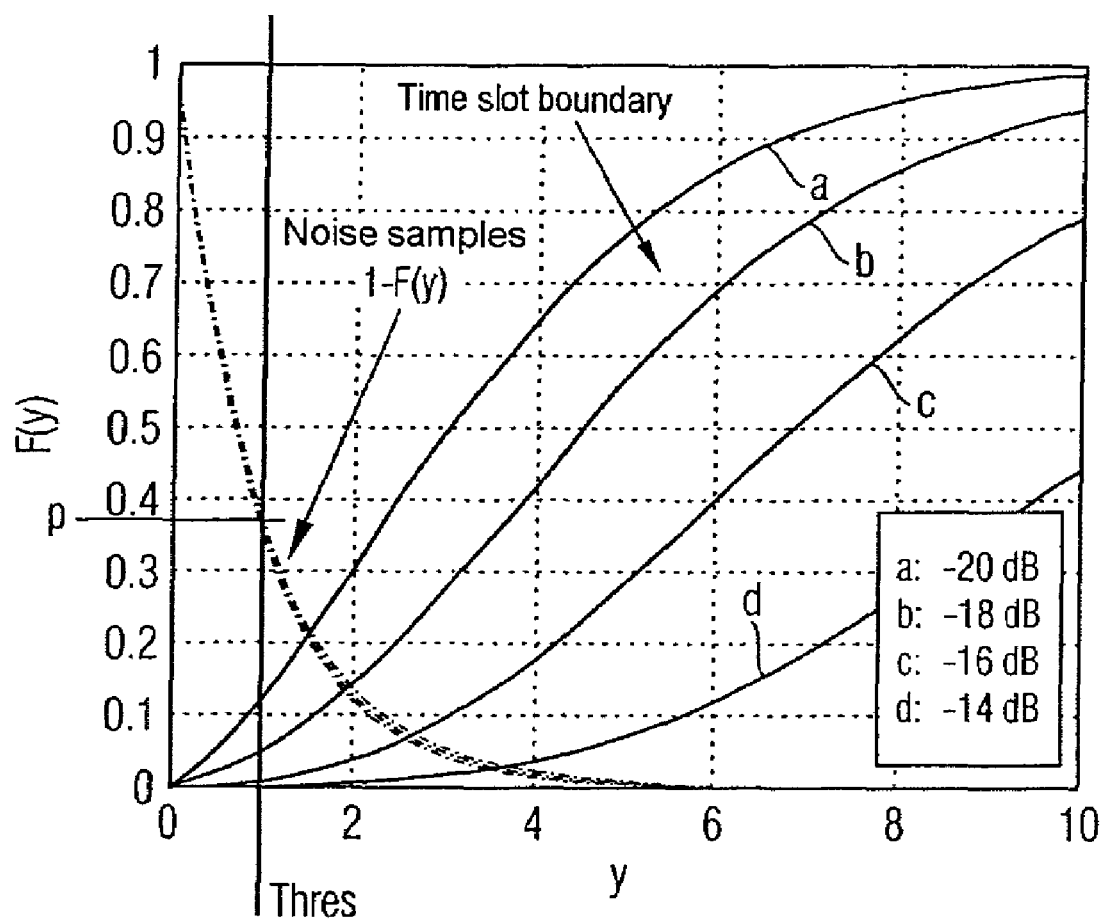
FIG. 6 is a graph illustrating the overall concept of the definition procedure for the first threshold value (Thres) according to one exemplary embodiment of the method according to the invention.

In order to reduce the contribution of the noise in the recording of a time slot boundary, symbols XX are averaged over a specific number of received time slots. Fundamentally, two averaging techniques are known, specifically coherent and incoherent recording, and these are defined by:

$$\overline{XX} = \frac{1}{S}\sum_{S=1}^{S} XX_S \qquad (1)$$

for the coherent case, and $$Y = \overline{XX}^2 = \frac{1}{S}\sum_{1}^{S} XX_S^2 \qquad (2)$$

for the incoherent case. The parameter S defines the number of time slots that are used for averaging. The variable XX(i) describes the result of the correlation operation (filter operation)

$$XX_S(i) = \frac{1}{256}\sum_{k=1}^{256} x(k)_{pSC} \cdot r(k+i-1) \qquad (3)$$

at the sample point i. The sequence x(k)pSCH (pSCH=primary synchronization channel) is defined as the primary synchronization sequence of length 256, and r(n) describes the received signal sequence.

It is obvious that neither the phase information for the received signal nor the exact carrier frequency are known at the point of time slot synchronization. Incoherent recording according to equation (2) must therefore be used for a time slot synchronization concept.

The power drop for incoherent detection in comparison to coherent detection is, as is known, approximately 3 dB, in which case it should be remembered that coherent recording cannot in practice be used at the time of synchronization. Incoherent recording will be described in more detail in the following text. Incoherent recording requires no information about the channel phase.

One disadvantage of incoherent recording, specifically a direct value shift in the decision sequence Y, occurs when it has to be carried out using a zero mean random process, which strongly interferes with the desired signal sequence. On the assumption that the received signal r(k) comprises the desired synchronization sequence $x(k)_{pSC}$ and a disturbance component, defined by the sequence n(k), equation (3) can be converted to the following equation:

$$XX(i) = \frac{1}{256}\sum_{k=1}^{256} \left[ \left( \underbrace{x(k)_{pSC} \cdot x(k+i-1)_{pSC}}_{\text{desired signal and self-noise}} \right) + \left( \underbrace{x(k)_{pSC} \cdot n(k+i-1)}_{\text{Disturbance}} \right) \right]_{i=1...5120} \qquad (4)$$

Furthermore, the self-noise in the desired signal contribution is regarded as being negligible.

The situation where i>1 will be considered first of all. It follows from the equations (2) and (4) that:

$$Y(i) = \frac{1}{S}\sum_{S=1}^{S}\left(\frac{1}{256}\sum_{k=1}^{256} x(k)_{pSC} \cdot n_S(k+i-1)\right)^2 \bigg|_{1<i\leq 5120} \qquad (5)$$

If n(k) is a zero mean Gaussian process and x(k) is a zero mean binomially distributed process with a chip power of unity, then it is clear that XX(i) for i>1 is also a zero mean Gaussian process, which is defined by the same parameters as the random process $$\frac{1}{256}n(k).$$

For S=1, it follows that the decision variable Y(i>1) is centrally $\chi^2$-distributed with a degree of freedom of n=2. In this case, it should be noted that x(k) and n(k) are complex signals.

The DC component of the decision sequence Y(i) is equal to the expected value of Y for a large number of implementations, Y(i). The expected value of Y may be expressed as:

$$E\langle Y \rangle = E(XX_S^2) \qquad (6)$$

and, furthermore, as $$\begin{aligned} E(Y) &= E(XX_S^2) - E^2(XX_S) \\ &= \text{var}(XX_S) \\ &= \text{var}(\text{real}(XX_S)) + \text{var}(\text{imag}(XX_S)) \end{aligned} \qquad (7)$$

On the assumption that XX (i), i>1, which has the same statistical characteristic as $$\frac{1}{256}n(k),$$

the equation (7) can be changed to the following form:

$$\begin{aligned} E\langle Y\rangle &= \frac{1}{256}\sigma^2_{real(n)} + \frac{1}{256}\sigma^2_{imag(n)} \\ &= \frac{1}{256}\sigma^2_n \end{aligned} \qquad (8)$$

For i=1 (time matching of the time slot boundary), the following equation is obtained from the equations (2) and (4):

$$Y(i) = \frac{1}{S}\sum_{S=1}^{S}\left(\frac{1}{256}\sum_{k=1}^{256}(x^2(k) + x(k)_{pSC} \cdot n_S(k))\right)^2 \bigg|_{i=1} \qquad (9)$$

and, corresponding to equation (8) and the literature reference Proakis J. G.: DIGITAL COMMUNICATIONS, Third Edition, McGraw-Hill Book Co., Singapore 1995, page 43, $$\begin{aligned} E\langle Y_i\rangle &= \sigma_x^4 + \frac{1}{256}\sigma_n^2 \bigg|_{i=1} \\ &= 1 + \frac{1}{256}\sigma_n^2 \end{aligned} \qquad (10)$$

for the expected value of Y, where Y(i=1) describes a non-central $\chi^2$ statistic. It can easily be shown that the expected value of Y is independent of S. In general:

$$\begin{aligned} E\langle Y_S\rangle &= E\left\langle\frac{1}{S}\sum_{S=1}^{S} Y_S\right\rangle \\ &= \frac{1}{S}\sum_{S=1}^{S} E\langle Y_S\rangle \\ &= \frac{S}{S}E\langle Y_S\rangle \end{aligned} \qquad (11)$$

In consequence, the DC component shift in Y depends only on the energy contribution of the disturbances and is independent of the number of time slots that are used for averaging.

Another important aspect is the variance of the decision sequence Y. For an initial investigation, it is assumed that S=1, so that:

$$\text{var}\langle Y\rangle = E\langle Y^2\rangle - E^2\langle Y\rangle \tag{12}$$

We will also consider the case where i>1 (central $\chi^2$ distribution). Reference should be made to the document Proakis J. G.: DIGITAL COMMUNICATIONS, Third Edition, McGraw-Hill Book Co., Singapore 1995, page 43, for the solution to the equation (12) with respect to the zero mean Gaussian process XX, according to which equation (12) can be expressed as follows:

$$\begin{aligned}\text{var}(Y) &= E\langle Y^2\rangle - \frac{1}{256^2}\sigma_n^4\bigg|_{1<i\le 5120} \\ &= 2\left(\frac{1}{256^2}\sigma_{real(n)}^4 + \frac{1}{256^2}\sigma_{imag(n)}^4\right)\bigg|_{1<i\le 5120} \\ &= \frac{1}{256^2}\sigma_n^4 \\ &= E^2\langle Y\rangle\end{aligned} \bigg\} \text{valid only for degrees of freedom equal to two} \tag{13}$$

In the case of a non-central $\chi^2$-distributed process (i=1), reference should be made to the document Proakis J. G.: DIGITAL COMMUNICATIONS, Third Edition, McGraw-Hill Book Co., Singapore 1995, page 45, and equation (12) leads to $$\begin{aligned}\text{var}(Y) &= E\langle Y^2\rangle - \left(1 + \frac{1}{256}\sigma_n^2\right)^2 \\ &= 2\left(\begin{array}{c}\frac{1}{256^2}\sigma_{real(n)}^4 + \\ \frac{1}{256^2}\sigma_{imag(n)}^4\end{array}\right) + \frac{4}{256}\sigma_{real(n)}^2 \\ &= \frac{1}{256^2}\sigma_n^4 + \frac{2}{256}\sigma_n^2 \\ &= E^2\langle Y_{i>1}\rangle + 2E\langle Y_{i>1}\rangle\end{aligned}\bigg\}\text{valid only for degrees of freedom equal to two} \tag{14}$$

Finally, the equations (13) and (14) can be generalized for the situation where S>1. Corresponding to equation (11), the variance of the decision variables $Y_s(i)$, where S is the number of time slots used for the averaging process, can be expressed as follows:

$$\begin{aligned}\text{var}(Y_S) &= \text{var}\left(\frac{1}{S}\sum_{S=1}^{S} Y_S\right) \\ &= \frac{1}{S^2}\cdot\text{var}\left(\sum_{S=1}^{S} Y_S\right) \\ &= \frac{1}{S}\cdot\text{var}\langle Y\rangle\end{aligned} \tag{15}$$

Equation (15) shows that the variance of Y is inversely proportional to the number of averaging iterations S. We will now turn to an exemplary embodiment of the invention on the basis of these general theoretical explanatory notes relating to incoherent recording.

A two-step time slot synchronization algorithm is used in the method according to the invention, based on the statistical model for incoherent recording described above. The last-mentioned algorithm was developed with the aim of achieving good recording results within a time period specified by the system, with low storage costs and a low power consumption at the same time. In the method according to the invention, a subset $Y_{sub}$ from the decision sequence Y is selected downstream from the matched filter (FIR filter) during the first processing step. The first method step is correspondingly also referred to in the following text as the "initial selection step". On the basis of the statistics of Y, it is possible to specify a probability of the desired time slot boundary being contained in $Y_{sub}$. In the simplest case, the first method step does not use any time slot averaging whatsoever. However, in general it is better to use an observation time period of two or more time slots, for example N1=5, 10 or 15. Finally, the index numbers for the selected samples are transferred to the second method step.

In the second method step, an averaging process is carried out over a specific number of time slots, in order to reduce the influence of disturbances. The second method step is thus also referred to in the following text as the "averaging step". The averaging procedure may be based on a hard or a soft averaging approach. In the case of a hard averaging approach, only samples above a specific threshold value are counted. This saves memory space. The first method step, that is to say the initial selection step, will be explained in more detail in the following text with reference to an exemplary embodiment of the method according to the invention. During this first step of the method, an initial selection operation is carried out over a specific number of time slots N1, in order to minimize the number of possible candidates for time slot boundary index numbers. For this reason, a well-defined first threshold value (Thres) is introduced, and the total number of threshold value crossings for each sample index (5120 half chips) is counted.

The following statement may be made with regard to the first threshold value Thres:

The first method step uses a priori knowledge about the statistical distribution of the samples y(i) in the decision sequence Y. As has already been described above, the y(i) samples are centrally $\chi^2$-distributed for index numbers which do not correspond to a time slot boundary of a received cell, and they are non-centrally $\chi^2$-distributed for index numbers i which do correspond to a time slot boundary of a received cell. FIG. 2 shows the density function, and FIG. 3 shows the distribution function, of both statistical variables.

First of all, we will consider two statistically independent random processes, specifically $Y_{i=1}$, corresponding to the random variables y(i=1), and $Y_{i>1}$, corresponding to the random variables y(i>1), where i=1 defines the index of a time slot boundary, and i>1 defines any other index numbers.

FIGS. 2 and 3 can be used to derive the probability of y(i=1) and y(i>1) being above or below a specific first threshold value Thres. There are two situations of interest for the recording problem in question here. First of all, we are interested in the probability of y(i>1) exceeding the first threshold value Thres. In other words, if the density function $f_y(y(i>1))$ of the random process $Y_{i>1}$ is known, we can calculate the probability of y(i>1) being recorded above the first threshold value Thres (false alarm rate).

Thus:

$$P[y_{i>1} > Thres] = \int_{Thres}^{\infty} f_{Y_{i>1}}(y)dy \tag{16}$$

-continued $$= 1 - \int_0^{Thres} f_{Y_{i>1}}(y) dy$$

where $$f_{Y_{i>1}}(y) = \frac{1}{\sigma^2} e^{-\frac{y}{\sigma^2}}; \sigma^2 = \sigma_I^2 + \sigma_Q^2 \quad (17)$$

Here, equation (17) describes the density function of a central $\chi^2$ distribution with two degrees of freedom (random processes in the I phase and in the Q phase) with $\sigma^2_I$ and $\sigma^2_Q$ being the disturbance energy in the respective branch.

Furthermore, the probability of y(i=1) being below the first threshold value Thres must be determined (rejection rate). Taking account of the fact that $Y_{i=1}$ must be a non-central $\chi^2$ distribution with two degrees of freedom, it is possible to write:

$$P[y(i=1) < Thres] = \int_0^{Thres} f_{Y_{i=1}}(y) dy \quad (18)$$

where $$f_{Y_{i=1}}(y) = \frac{1}{\sigma^2} e^{-\frac{x^2+y}{\sigma^2}} I_0\left(\sqrt{y}\,\frac{2s}{\sigma^2}\right); \sigma^2 = \sigma_I^2 + \sigma_Q^2 \quad (19)$$

where $I_0(\cdot)$ is the zero-order modified Bessel function, and $s^2$ is the expected value of y(i=1). Here, equation (19) is normalized with respect to $s^{2=1}$. FIG. 4 illustrates equations (16) to (19) in the form of a graph.

The result of step 1 can be subdivided into N1+1 result classes k, k=0, 1, . . . , N1 (counted at least 0, 1, . . . N1 times). The number of positive recordings for each class is related to a binomial distribution $W_p^{N1}$, where p describes the probability of a sample crossing the first threshold value Thres. The probability of a sample value y being counted k times is:

$$W_p^{N1}(k) = P(Y_{N1} = k) = \binom{N1}{k} p^k (1-p)^{N1-k} \quad (20)$$

and the probability of a sample value y belonging to a result class=k0 is:

$$P(Y_{N1} \geq k0) = \sum_{k=k0}^{N1} \binom{N1}{k} p^k (1-p)^{N1-k} \quad (21)$$

in a corresponding manner.

On the assumption that the available memory space is M values and that the number of possible time slot boundary index numbers is L (for example L=OSR·2560) (OSR=oversampling rate) it is possible to calculate the maximum permissible probability P of a sample value y being a member of a result class k or higher. We can write:

$$P(Y_{N1} \geq k) = \frac{M}{L} \quad (22)$$

Furthermore, we have to select a basic result class k0. This basic result class k0 is defined as the result class which contains the indices which have been registered at least k0 times above the first threshold value Thres. Preferably, k0 should be chosen to be in the center between 0 and N1. The right-hand side of equation (21) can be converted by means of a so-called binomial polynomial. For example, if N1=5 and the class is k0=3, this binomial polynomial is: $10p^3-15p^4+6p^5$.

The equations (21), (22) and the binomial polynomial mentioned above make it possible to calculate the necessary probability p of the sample value y crossing the first threshold value Thres. This is illustrated in the following example:

EXAMPLE

N1=5, k03, L=5120, M=1400 - - - p ?

$$\frac{1400}{5120} = \sum_{k=3}^{5} \binom{5}{k} p^k (1-p)^{5-k} = 0.2734$$

from equation (21), equation (22)
2. $0.2734 = 10p^3 - 15p^4 + 6p^5$ (see above)
3. p=0.375 (result of the numerical solution of 2).

In this case, p is the probability with which an index which is not associated with a time slot boundary may be detected at most above a threshold value at each time slot in order to prevent a memory overflow after 5 counts and selection of the basic class k0=3.

Finally, the first threshold value Thres now has to be calculated on the basis of the resultant value for the probability p explained above. For sake of clarity, only one received cell with one time slot boundary corresponding to a sought sample with the index number i=1 will be considered first of all. As already discussed above, the sample values y that are not associated with a time slot boundary index position are centrally $\chi^2$-distributed (after correlation and squaring). The decision sequence Y produced after the filter contains 5120 samples (one time slot). In consequence, there are 5119 samples, each of which can be expected with a probability of $P[y_{i>1}>Thres]$ above the first threshold value Thres. If N is the number of samples in our decision sequence Y, then we can calculate the expected value for the number of samples y(i>1) above the selected first threshold value Thres by means of the following equation:

$$M = (N-1) \cdot P[y_{i>1} > Thres] \quad (23)$$

The value of M governs the required memory space, that is to say the number of memory cells, which are needed in order to allow storage of the subset $Y_{sub}$ to be selected in the initial selection step. In practice, a specific memory size is predetermined by the system hardware. The equation can thus be used in order to calculate an equation for calculation of a specific first threshold value Thres as a function of the available memory space M. Taking into account equations (16) and (23), this results in:

$$Thres = Q_{i-\alpha,2} \quad (24)$$

where $Q_{1-\alpha,2}$ indicates the quantil of order $1-\alpha$ of the distribution function in equation (17), where: $1-\alpha = P[y_{i>1} Thres]$.

Taking into account equation (16), it becomes clear that the first threshold value Thres depends on $\sigma^2$, and is thus also dependent on the received disturbance power.

Finally, it is also desirable to obtain an explanation of the probability of the sample y(i=1) which is associated with the desired time slot boundary being contained in M, or not. If equation (24) is substituted in equation (18), this results in:

$$F1_{Rej} = P[y_{i=1} < Q_{1-\alpha}] = \int_0^{Q_{1-\alpha,2}} f_{Y_{i=1}}(y) dy \quad (25)$$

Equation (25) defines the probability of the desired sample y(i=1) not being contained in the subset $Y_{sub}$, which has M elements, for the observed $E_{pSCH_e}$ for the $I_0$ ratio.

FIG. 5 illustrates solutions to the equation (25), in the form of a graph, for various values of M and $\sigma^2$.

FIG. 6 illustrates the overall concept of the definition procedure for the first threshold value Thres according to one exemplary embodiment of the method according to the invention, specifically:

1. Find the $|YY|^2$ position of the non-time slot boundary's "$1-F_{y>1}(|YY|^2)$" function for a probability of p for $y \geq |YY|^2_{Th}$.
2. Set Thres $=|YY|^2_{Th}$ (quantil)
3. The function value of the time slot boundary's "$F_{Y=1}(|YY|^2)$" function for $|YY|^2_{Th}$ indicates the probability of a sample value y which relates to a specific reception path with a power contribution of –z dB for the overall received in-band spectrum not being greater than the first threshold value Thres. → rejection measure.

As can be seen, slight dispersion of the non-time slot boundary functions for different signal power contributions is caused by automatic gain control (AGC) normalizing the power rate RSSI (Received Signal Strength Indicator) of the overall received in-band spectrum (RSSI=signal power/(signal power+noise power+disturbance power)), but not the SNIR (SNIR=signal/(disturbance+noise)).

If the first threshold value Thres is set correctly, the initial selection method can be carried out. On average, a subset of M initial selection results is obtained within the target class k0. Since the first method step, that is to say the initial selection method step, is based on a statistical model, the number of initially selected index positions fluctuates through the target value M, which is equal to the amount of memory space provided. In consequence, some critical or inefficient constellations may occur, which are discussed in the following text.

1. Memory overflow as a result of a large number of initial selection results as an assumption during the calculation of the first threshold value Thres for the target class k0.
2. Inefficient use of memory space owing to a small number of initial selection results as an assumption during the calculation of the first threshold value for the target class k0.

In the first case, it is necessary to switch from the target class to the next-higher result class in order to overcome the overflow effect, and, in the end, this leads to the second case.

In the second case, the maximum size of the available memory is not used.

In consequence, both constellations obviously reduce the performance of the initial selection step. In order to balance out these two effects, the remaining memory space can be filled with remaining values of the next-lower result class with randomly selected index numbers, which should preferably be uniformly distributed.

In addition, it is worthwhile adding a certain amount of extra memory space (for example 10% of M), in order to prevent or at least to minimize the occurrence of memory overflow.

Examples:

M=1400, k0=3

1. Memory high=M+10% M=1540 words %, switch to (k0+1) class
2. Memory low=M–10%·M=1260 words %, consider the (k0–1) class.
3. If the number of initial selection results (k0) is greater than memory high, then k0++
4. Resultant index number=index (k0)
5. If the number of initial selection results (k0) is less than memory low, then add the index (resultant index number, k0–1).

The initial selection method just described is optimized for efficient memory use. However, since the memory is filled with randomly selected index numbers from the (k0–1) class (see the previous example, step 5), only one subset of the resultant index numbers is based on the statistical a priori knowledge.

Let us now turn to the second step, that is to say the averaging step.

In the second step, an averaging process is carried out over a certain number of slots for the M samples which were preselected in the initial selection step and are identified only by the index numbers.

The averaging procedure in the second method step may be carried out as hard averaging or as soft averaging.

The averaging procedure in the second method step could, for example, be carried out by setting a second threshold value (Thres2), and by taking into account only those elements of the subset $Y_{sub}$ which were preselected in the first method step and which exceed this second threshold value Thres2. However, it would also be possible to define or even to determine a fixed number of elements to be taken into account after the averaging procedure from the subset $Y_{sub}$ preselected in the first method step, for example the thirty greatest values, for always addressing only the greatest value from said subset $Y_{sub}$ as the slot boundary.

Two exemplary embodiments (hard averaging and soft averaging) from the set of embodiment options for the second method step mentioned above will be described in the following text, in which a second threshold value $Thres2_{hard}$ or $Thres2_{soft}$ is set. Only the greatest value is selected in the following exemplary embodiment for the analysis of hard averaging. In contrast, all values that exceed a second threshold value $Thres2_{soft}$ are taken into account here for the subsequent processing operation for the soft averaging approach described in the following exemplary embodiment.

First of all, let us turn to a hard averaging exemplary embodiment. FIGS. 7 to 12 relate to the hard averaging approach.

The number of counts which can be recorded above the second threshold value $Thres2_{hard}$ is binomially distributed both for the samples which correspond to a time slot boundary and for the samples which correspond to any other index number. However, the distribution function as such depends on the number of averaging slots, on the $E_{pSCH_e}$ to $I_0$ ratio, and on the second threshold value $Thres2_{hard}$. The probability function of a discrete random process Y2 such as this can be described by:

$$F_{Y2}(x) = \sum_{k=0}^{x} P[x=k] = \sum_{k=0}^{x} \binom{S}{k} p^k (1-p)^{S-k} \qquad (26)$$

and its probability density function can correspondingly be described by:

$$f_{Y2}^S(x) = \sum_{k=0}^{S} \binom{S}{k} p^k (1-p)^{S-k} \sigma(x-k) \qquad (27)$$

Figure 7:
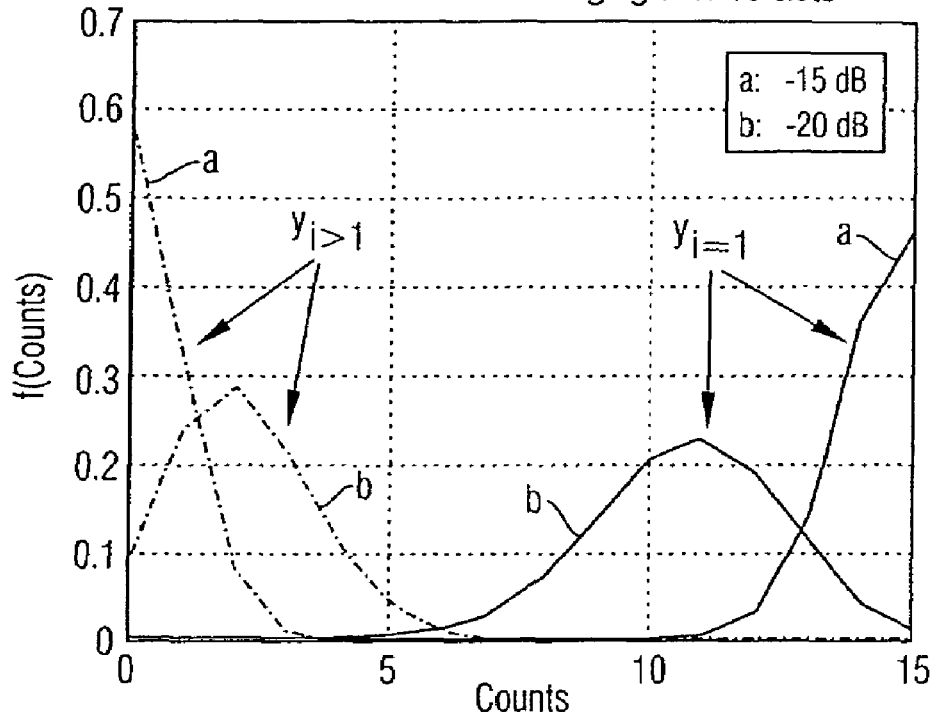
FIGS. 7 & 8 are graphs illustrating distribution functions for various parameter sets in a second method step of one exemplary embodiment of the method according to the invention for samples that correspond to a time slot boundary, and for those samples that are not a time slot boundary.
Figure 8:
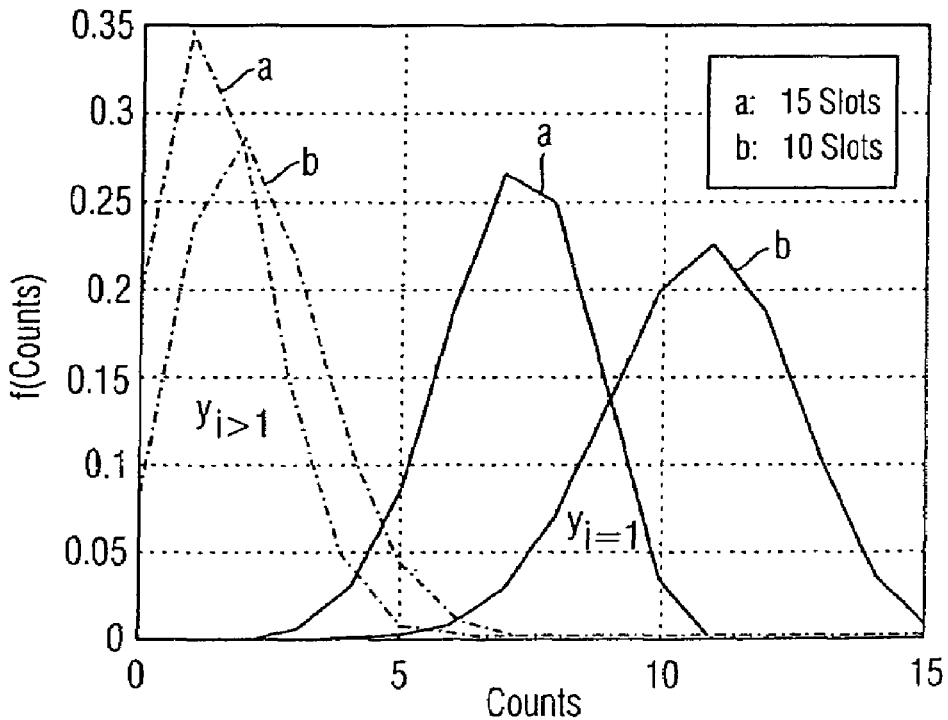

In this case, p is the probability that $y(i=1)$ and $y(i>1)$ above $Thres2_{hard}$ can be detected, and S defines the number of slots used for the averaging process. FIGS. 7 and 8 show the distribution functions for various parameter sets for samples that correspond to a time slot boundary and for those samples which are not a time slot boundary, respectively. As mentioned above, the distribution function for both processes is highly dependent on the choice of the $Thres2_{hard}$ value. The setting of $Thres2_{hard}$ is dealt with further below. The graphs illustrated in FIGS. 7 and 8 have been based on the assumption of an ideal $Thres2_{hard}$ value.

In order to find the answer to the recording problem in the second method step, it is necessary to determine the probability of the index of the slot boundary being in the subset M that is counted the most.

First of all, let us assume that M contains $y(i=1)$ and let us also consider two independent statistical processes $Y_{i=1}$, corresponding to a sample which corresponds to a time slot boundary, and $Y_{i>1}$, corresponding to a sample which is associated with any other index number. These processes are binomially distributed corresponding to the equations (26) and (27). The probability of false detection based on the assumption that only the strongest peak is taken into account is thus, for the second method step:

$$P[y_{i=1} < y_{i<1}] = p[y_{i=1} - y_{i>1} < 0] \qquad (28)$$

For the purpose of a short development of equation (28), we define a new random variable $x = y(i=1) - y(i>1)$. Thus:

$$P(x<0) = \int_{-\infty}^{0} f_x(y) dy \qquad (29)$$
$$= \int_{-\infty}^{0} f_{Y_{i<1}}(y) + f_{Y_{i>1}}(-y) dy$$
$$= \int_{-\infty}^{0} conv[f_{Y_{i=1}}(y), f_{Y_{i>1}}(-y)] dy$$

Figure 9:
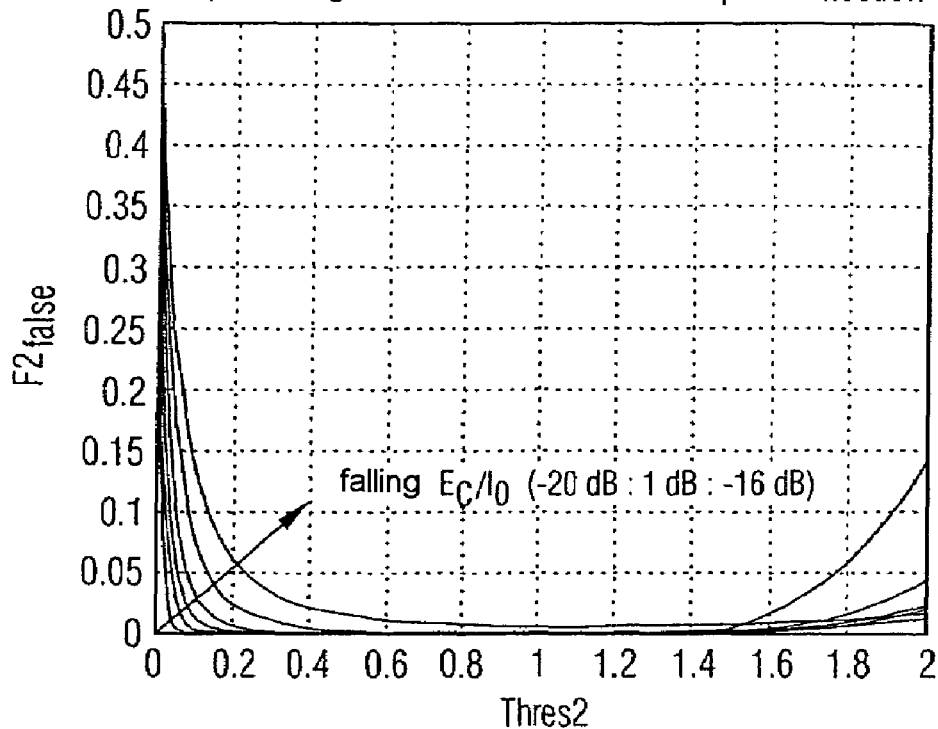
FIG. 9 is a graph illustrating a probability equation for various $E_{pSCH_c}$ to $I_0$ ratios, and a wide range of settings of a second threshold value.

Equation (29) leads to different results for different threshold values $Thres2_{hard}$. FIG. 9 provides an illustration, in the form of a graph, of equation (29) for different $E_{pSCh_c}$ to $I_0$ ratios and a wide range of $Thres2_{hard}$ settings. The printed crosses mark the minimum of each curve, and thus the ideal value for the second threshold value $Thres2_{hard}$.

FIG. 9 shows the relationship between the ideal $Thres2_{hard}$ and $E_{pSCH_c}/I_0$. It is proposed that a table be used for the setting of $Thres2_{hard}$ for different $E_{pSCH_c}/I_0$ whose entries have been calculated numerically in advance. Alternatively, of course, it is also possible to access the ideal second threshold value $Thres2_{hard}$ analytically.

Figure 10:
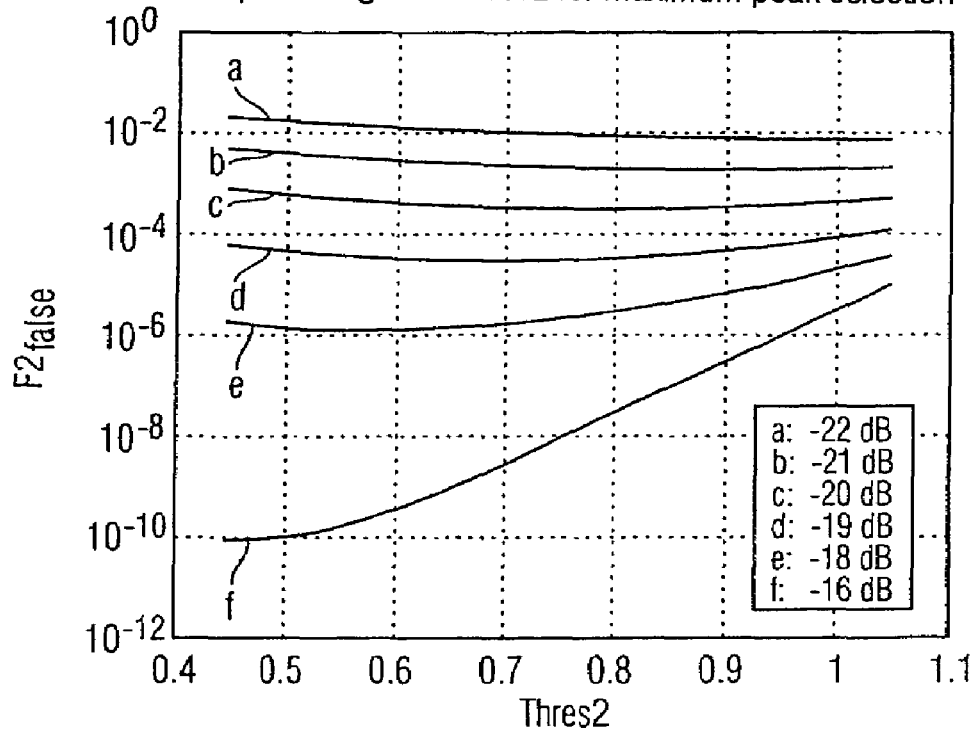
FIG. 10 is a graph illustrating an enlargement of a detail from the diagram in FIG. 9, in a half-logarithmic form.

A difficulty occurs at this point, because $E_{pSCH_c}/I_0$ is not known during the synchronization step. However, this problem can be solved as follows: if $Thres2_{hard}$ is set to a fixed value, preferably to the ideal $Thres2_{hard}$ for the lowest desired $E_{pSCH_c}/I_0$ then the attenuation in a near area is acceptable and the significant attenuation is bearable for a better $E_{pSCH_c}/I_0$, provided that the false detection probability remains below a specific level. FIG. 10 shows an enlargement of FIG. 9, illustrated in the form of a half-logarithmic graph. In this case, the effect of a fixed second threshold value $Thres2_{hard}$ can be determined directly, if the values are investigated for each curve along a vertical line, for example at 0.74 (ideal $Thres2_{hard}$ for $-20$ dB).

Figure 11:
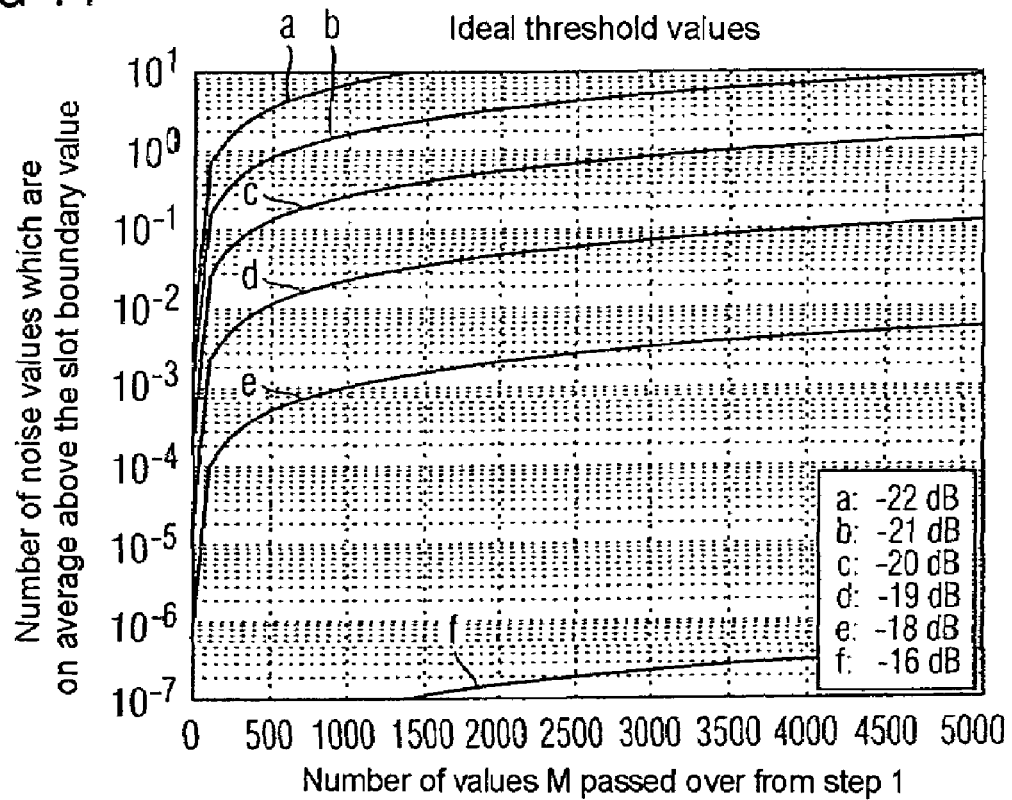
FIG. 11 is a graph illustrating the relationship between the number of noise values which are on average above the time slot boundary value, and the number of values transferred from the first method step to the second method step for an ideal second threshold value for each $E_{pSCH_c}/I_0$ curve.
Figure 12:
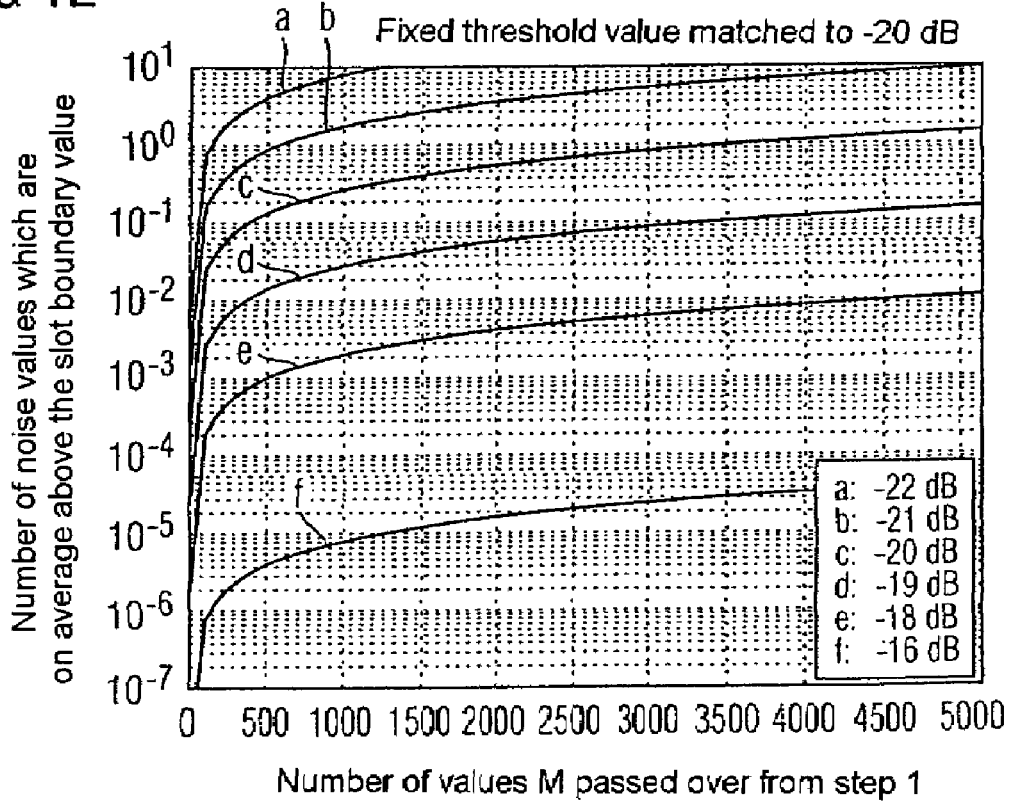
FIG. 12 is a graph illustrating the relationship between the number of noise values which are on average above the time slot boundary value, and the number of values transferred from the first method step to the second method step for a fixed second threshold value, matched to $-20$ dB.

Finally, the index number should be found for the time slot boundary during the method step 2. The above analyses have been carried out only for two statistical processes. As has already been explained above, a subset of M samples must be processed in step 2. Based on the assumption that $y(i=1)$ is contained in M, then:

$$F2_{Rej} = (M-1)P[x<0] \qquad (30)$$

where $P[x<0]$ is defined in equation (29). In consequence, the performance of the second method step depends on the number of samples selected during the first step, and on the size of the available memory. FIGS. 11 and 12 give a good impression of how the performance of the method step 2 is related to M for different $E_{pSCH_c}/I_0$ values. As already discussed further above, FIGS. 11 and 12 confirm the assumption that a fixed second threshold value $Thres2_{hard}$ does not affect the performance in a near area around the associated $E_{pSCH_c}/I_0$ value (see FIG. 12). The performance in an area of +2 dB around the $E_{pSCH_c}/I_0$ value that is associated with the fixed $Thres2_{hard}$, in this case $-20$ dB, is obviously virtually unaffected. The decrease in performance becomes more visible in a wider area, but remains below a false detection rate of $10^{-3}$. The results for fixed $Thres2_{hard}$ values may thus be considered to be acceptable for larger areas as well.

Figure 13:
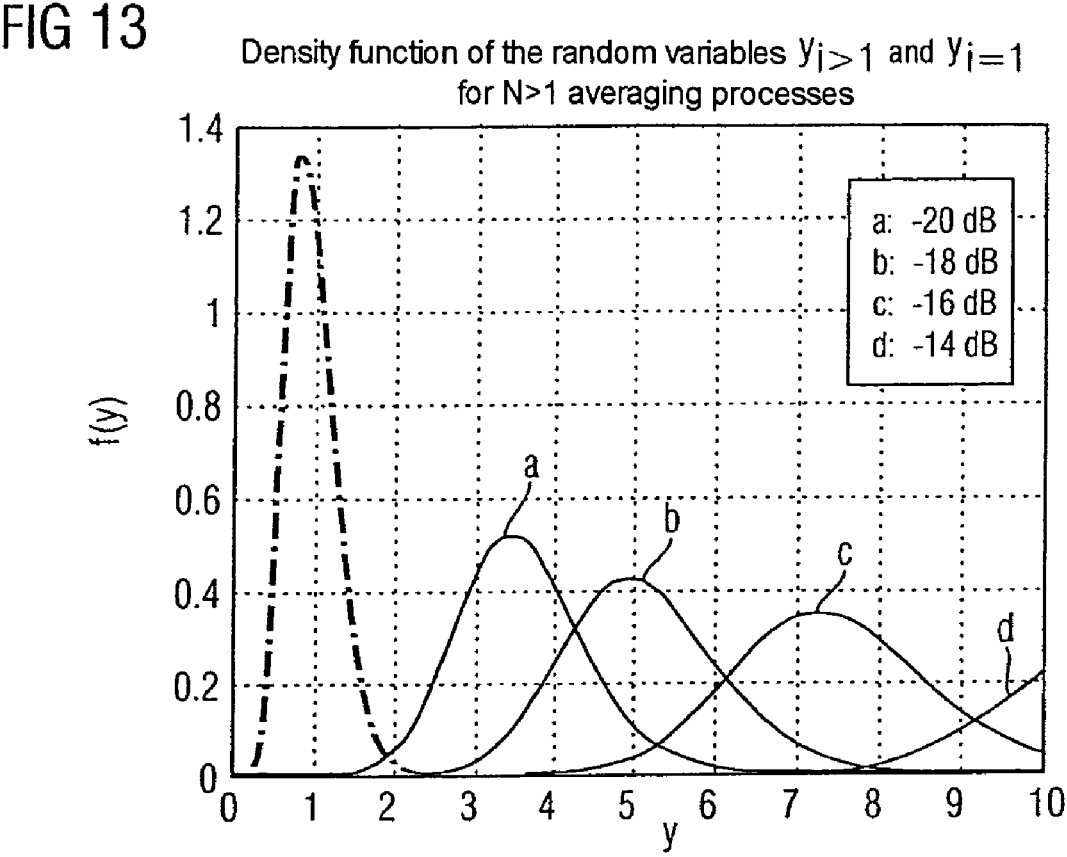
FIG. 13 is a graph illustrating the probability density function of decision function values for various signal power contributions.

A soft averaging exemplary embodiment for the second method step will now be described in the following text. FIG. 13 relates to the soft averaging approach. In the second method step, which could also be referred to as a "postprocessing step", the received data stream is once again correlated with the primary synchronization code. However, only the preselected index number subset that was selected in the previous method step is considered in this case. In contrast to the first method step, the correlation results in the second method step are accumulated for each index number for a specific number of slots N. The hardware must provide sufficient memory space for this purpose in order to carry out this soft averaging procedure (M depends on the size of the preselected subset, see the statements above).

The averaging procedure results in a decision function as follows:

$$X_i = \sum_{s=1}^{N} (xcorr\{r_{i,s}; pSCH\})^2, \qquad (31)$$

where r is the received data stream at the index position i of the slot s and PSCH is the primary synchronization code. The function xcorr $\{x,y\}$ carries out a cross-correlation process between x and y.

Figure 14:
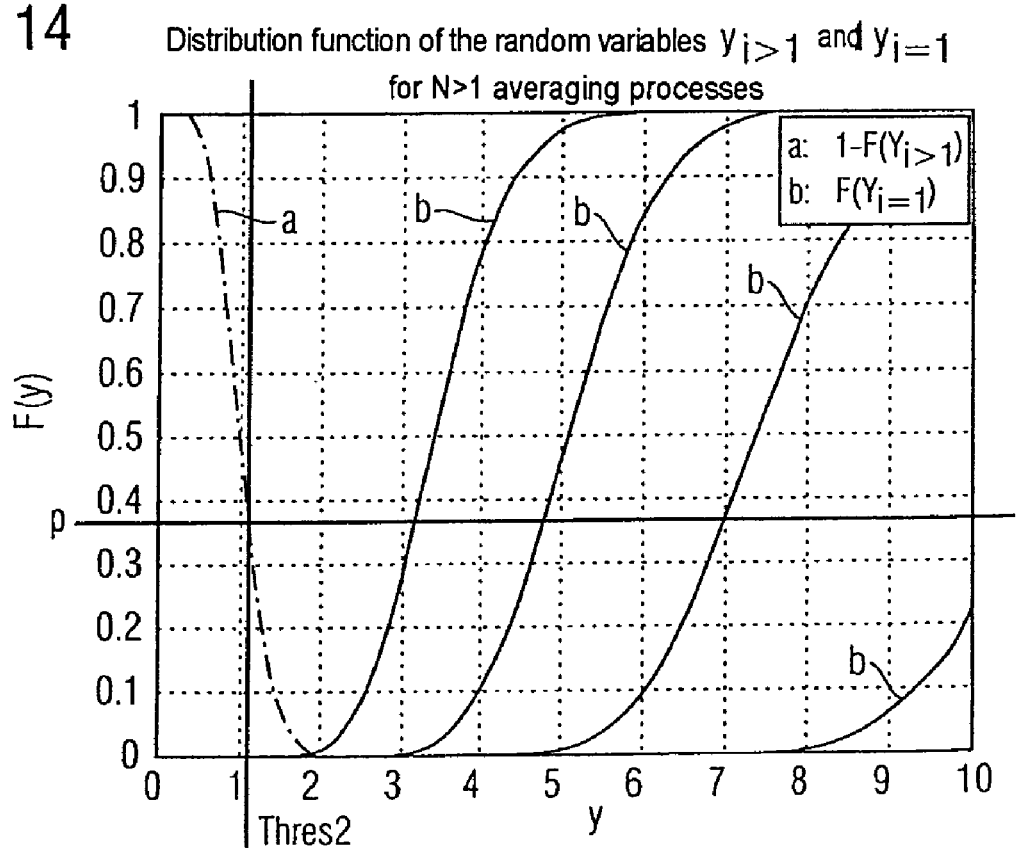
FIG. 14 is a graph illustrating the probability of decision function values for various signal power contributions.

The decision operation as such is carried out by comparing $x_i$ with a well-defined second threshold value $Thres2_{soft}$. The $Thres2_{soft}$ value can be calculated on the basis of statistical information, which is known from RSSI measurements and from initial selection step control results. FIG. 13 shows the probability density function and FIG. 14 shows the probability of $x_i$ for various signal power contributions and averaging over N2 time slots, with i for the dashed-dotted lines corresponding to a non-time slot boundary index (noise) and for the solid lines corresponding to a time slot boundary index (signal). Apart from this, FIG. 14 shows the relationship between the THRES2$_{soft}$ value and the expected false alarm rate (FA) or the rejection rate (Rej).

If a target false alarm rate (FA rate) is quoted, the second threshold value Thres2$_{soft}$ can be calculated by $$Thres2_{soft} = Q_{1-p_{FA\_Rate}:2N} \tag{32}$$

where Qn; m is the quantil of order n for a central $\chi^2$ distribution with m degrees of freedom. The Thres2$_{soft}$ value can be set or controlled with the aid of the Thres control information from method step 1.

If equation (32) is substituted into the probability function for a non-central $\chi^2$ distribution with 2N degrees of freedom, this results in:

$$F_{|XX|^2}(Thres2_{soft}) = \int_0^{Thres2_{soft}} \frac{1}{2\sigma_n^2} \left(\frac{y'}{s^2}\right)^{\frac{2N-2}{4}} e^{-\frac{(s^2+y')}{2\sigma_n^2}} \tag{33}$$

$$I_{(N-1)}\left(\frac{s\sqrt{y'}}{\sigma_n^2}\right) dy',$$

that corresponds to a rejection rate (Rej) for a received data path with a signal power of $\sigma_s^2$.

In this case, the signal power after the correlator (symbol power) $\sigma_s^2$ is defined by:

$$\sigma_s^2 = 256 \cdot 10^{\frac{SNR[dB]}{10}} \tag{34}$$

and the noise power of the I phase or Q phase $\sigma_n^2 = \sigma_{n;I}^2 = \sigma_{n;Q}^2$ (two degrees of freedom) is defined as $$\sigma_n^2 = \frac{1}{2}(1 - \sigma_s^2) \tag{35}$$

The non-central offset $s^2$ is defined as:

$$s^2 = \sum_1^N \sigma_s^2 \tag{36}$$

If a target rejection rate (Rej) is specified, the Thres2$_{soft}$ value is calculated as a function of the rejection rate (Rej) for an assumed received path from the base station with a signal power contribution of −z dB.

Corresponding to equation (32), this results in:

$$Thres2_{soft} = Q_{1-p_{Rej\_Rate}:2N}^{SNR} \tag{37}$$

where $Q_{n;\ m}^q$ is the quantil or order n for a non-central $\chi^2$ distribution with m degrees of freedom and an expected signal power contribution of q dB. If equation (37) is substituted into the probability function of a central $\chi^2$ distribution with 2N degrees of freedom then this results in:

$$F_{|XX|^2}(Thres2_{soft}) = \int_0^{Thres2_{soft}} \frac{1}{2^N \sigma_n^{2N} \tau(N)} y'^{N-1} e^{-\frac{y'}{2\sigma_n^2}} dy', \tag{38}$$

which corresponds to an FA rate for a processed noise sample. The variables in equation (38) have already been defined further above.

Taking into account the results just discussed, it can be stated that the performance of step 1 and the performance of step 2 with respect to one another depend in opposite senses on the number of selected samples M. This is true in general, irrespective of whether hard averaging or soft averaging is chosen for the second method step. However, it should be mentioned that the performance of step 2 is influenced by M only when step 2 may select only a limited number of peaks (in the simplest case only the strongest peak). The probability of time slot boundary recording for the overall method can be calculated as the conditional probability of time slot boundary recording during method step 2, subject to the condition of the sample y(i=1) for the sought time slot boundary being contained in M. Equations (25) and (30) result in:

$$F_D = (1 - F1_{Rej})(1 - F2_{Rej}) \tag{39}$$

for statistically independent processes in y.

So far, it has been assumed that only one time slot boundary occurs within one time slot. The statistical random process for all the samples of y(i>1) therefore had to be assumed to be centrally $\chi^2$-distributed. However, in practice, a number of cells send pSCH signals that reach the final antenna with a different reception energy via different paths. The derivations explained above are thus only ideal analyses, although these are sufficient on the assumption that the number of detectable time slot boundaries is small in comparison to the number of possible time slot boundaries.

Figure 15:
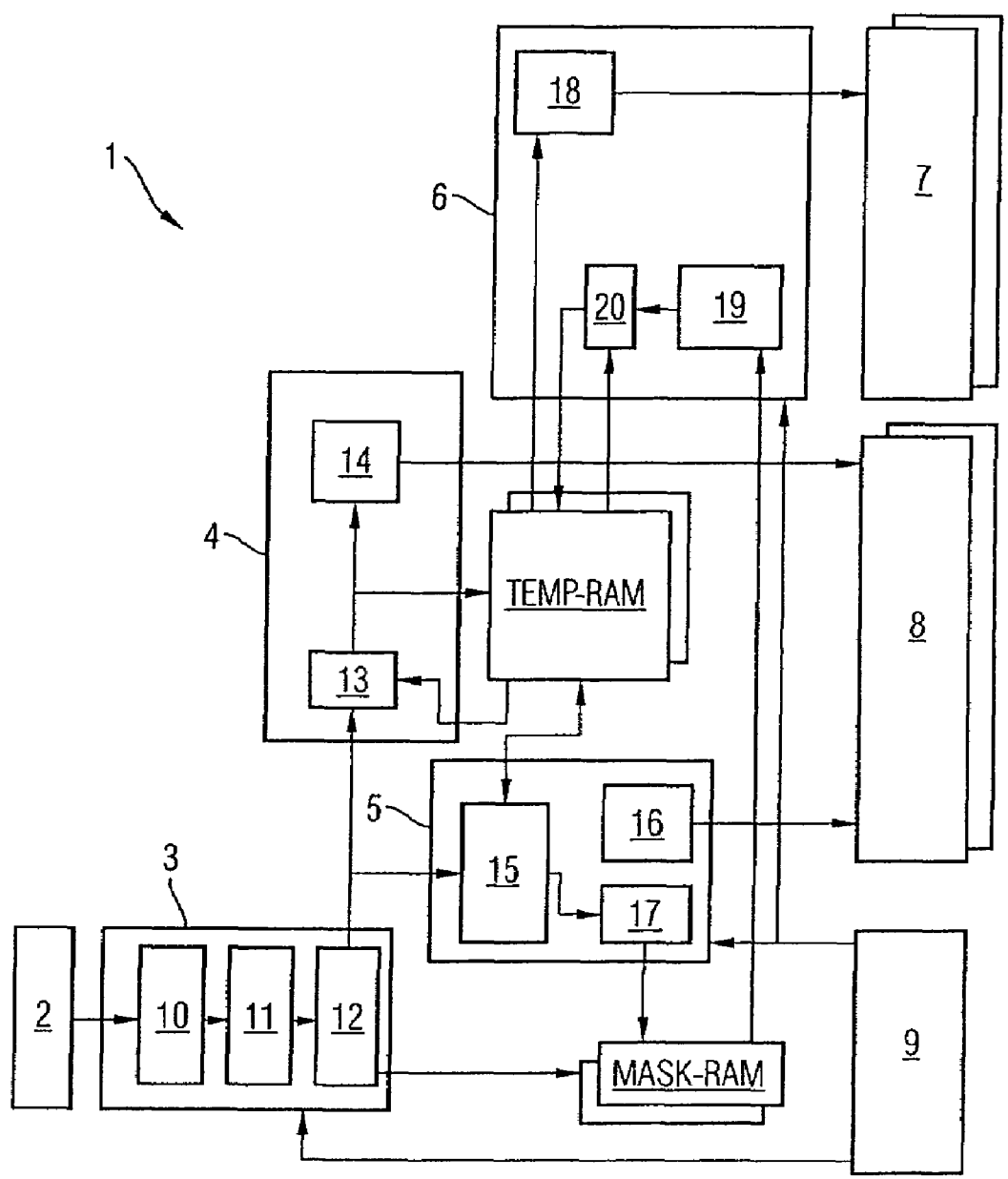
FIG. 15 is a block diagram illustrating an apparatus for performing synchronization according to an exemplary embodiment of the invention.

FIG. 15 illustrates, schematically, an arrangement 1, as an exemplary embodiment of the device according to the invention, by means of which time slot synchronization can be carried out, followed by frame synchronization. In the present exemplary embodiment, the data is transmitted between a base station and the mobile radio receiver in accordance with UMTS (Universal Mobile Telecommunications System) Standard.

According to the UMTS Standard, data is transmitted between the base station and the mobile radio receiver using a frame structure. In the UMTS Standard, each frame contains 15 time slots, which in turn each have 2560 chips.

The time slot synchronization code that is used for time slot synchronization in the UMTS Standard is also referred to as the primary synchronization code (pSC). The frame synchronization codes which are used for frame synchronization in the UMTS Standard are also referred to as secondary synchronization codes (sSC).

According to the UMTS Standard, the time slot synchronization code pSC and the frame synchronization codes sSC each comprise 256 chips.

Each frame synchronization code sSC results from position-wise multiplication of a generating Hadamard sequence by a sequence z which is common to all the frame synchronization codes sSC, and which is constructed as follows:

$$z = \langle b, b, b, -b, b, b, -b, -b, b, -b, b, -b, -b, -b, -b, -b \rangle \quad (40)$$

$$= b \langle 1, 1, 1, -1, 1, 1, -1, -1, 1, -1, 1, -1, -1, -1, -1, -1 \rangle$$

$$b = (1+j) \langle 1, 1, 1, 1, 1, 1, -1, -1, -1, 1, -1, 1, -1, 1, 1, -1 \rangle \quad (41)$$

$$= (1+j) \langle b(0), b(1), b(2), b(3), b(4), b(5), b(6), b(7), b(8), b(9),$$
$$b(10), b(11), b(12), b(13), b(14), b(15) \rangle$$

The sequence z comprises a sequence of 16 elements. Each of these elements is in turn based on a sequence b, which is in each case multiplied either by +1 or by −1. The complex-value sequence b is produced from a sequence of 16 correlation coefficients b(n) (n=0, 1, ..., 15), each of which may assume either the value +1 or the value −1. Each of the correlation coefficients b(n) represents one chip. Overall, this means that the sequence z has 256 correlation coefficients b(n) or chips.

The position-wise multiplication of the sequence z by 16 different Hadamard sequences each comprising 256 chips results in 16 different frame synchronization codes, each having 256 chips. One specific frame synchronization code is transmitted from the base station in each time slot in a frame. The sequence of the frame synchronization codes for a given base station is the same in each frame for the time slot that occurs at the same point in the time sequence. The frame start can be deduced from the frame synchronization code pattern that results from this in each frame. Furthermore, this pattern is characteristic of each base station, and is thus also used to determine the base station transmitting the frame synchronization codes.

In the present exemplary embodiment, the arrangement 1 comprises an input data buffer 2, a matched filter 3, a post-processing data path 4, a preselection data path 5, a buffer store TEMP-RAM, a buffer store MASK-RAM, a frame synchronization data path 6, result memories 7 and 8, as well as a digital signal processor 9.

The input data buffer 2 is connected downstream from the input to the arrangement 1. The input data buffer 2 is followed by the matched filter 3, in which a multiplication unit 10, an accumulator 11 and a multiplexer 12 are arranged in series in the stated sequence. Connections lead from the multiplexer 12 to inputs to the post-processing data path 4, the preselection data path 5 and the buffer store MASK-RAM.

Within the post-processing data path 4, the inputs of an adder 13 are fed both from the multiplexer 12 and from the buffer store TEMP-RAM. On the output side, connections lead from the adder 13 to the buffer store TEMP-RAM and to a threshold value detector 14, which feeds an input of the result memory 8.

The preselection data path 5 contains a preselection calculation unit 15, one of whose inputs is fed from the multiplexer 12, and whose other input has a bidirectional connection to the buffer store TEMP-RAM, a statistics calculation unit 16 and a threshold value detector 17 which follows the preselection calculation unit 15. The output of the statistics calculation unit 16 is connected to one input of the result memory 8.

The frame synchronization data path 6 contains an identification unit 18, a fast Hadamard transformation unit 19 and an adder 20. The identification unit 18 receives data from the buffer store TEMP-RAM and passes data to the result memory 7. The fast Hadamard transformation unit 19 receives data from the buffer store MASK-RAM, and passes data to the adder 20, which receives further data from the buffer store TEMP-RAM. On the output side, the adder 20 has a connection to the buffer store TEMP-RAM.

The digital signal processor 9 feeds the matched filter 3, the preselection data path 5 and the frame synchronization data path 6.

During time slot synchronization, the time slot synchronization code sample values received by the mobile radio receiver are first of all temporarily stored in the input data buffer 2 where, if required, they are appropriately preprocessed for further processing. The sample values are then correlated with the known time slot synchronization code in the matched filter 3. A correlation value produced by the matched filter 3 is compared in the preselection calculation unit 15 with a threshold value Thres. If the correlation value exceeds the threshold value Thres, a count is incremented. The start index for correlation is then shifted to the next sample value, and the correlation as well as the subsequent threshold value comparison is carried out once again. In this case, one count exists for each start index of the correlation within one time slot length. Since the sampling frequency for the input signal in the present exemplary embodiment is twice the chip frequency, 5120 sample values are received per time slot length. Accordingly, there are also 5120 counts. These are stored in the buffer store TEMP-RAM. The correlations are carried out over a number of time slot lengths, with the 5120 counts being incremented appropriately. Since each count is allocated a memory space of 4 bits in the buffer store TEMP-RAM, each count may have a value from 0 to 15. The buffer store TEMP-RAM must have a memory size of at least 5120·4 bits for storage of the counts. This corresponds to a 20 kbit memory. The minimum required memory for the implementation of the buffer store TEMP-RAM is thus defined in the present exemplary embodiment.

After a predetermined number of correlations with the known time slot synchronization code, the counts stored in the buffer store TEMP-RAM are compared in the threshold value detector 17 with a threshold value $Thres_{MASK}$ which is set as a function of the chosen basic class k0. In this case, the value of $Thres_{MASK}$ is chosen to be equal to k0−1. For a basic class of k0=3, this thus results in a $Thres_{MASK}$ value of 2. If the count is greater than the threshold value $Thres_{MASK}$, this is noted for the start index of the relevant correlation in the buffer store MASK-RAM. One and only one bit is allocated to each of the 5120 start indices in the buffer store MASK-RAM, for this purpose. If the threshold value $Thres_{mask}$ is exceeded, the relevant bit is set to 1, otherwise it is 0.

As a result of the preselection process described above, only the start indices to which a bit with value 1 is allocated in the buffer store MASK-RAM need be considered in the subsequent calculations. Correlations are once again carried out for these start indices with the known time slot synchronization code. In this case, the correlation values for each start index considered are accumulated, that is to say they are soft-averaged, over a predetermined number of runs by means of the adder 13. Each start index considered has a memory space of 16 bits available in the buffer store TEMP-RAM for the result of its associated correlation, with 8 bits respectively being used for the real part and for the imaginary part of the correlation result. Since the buffer store TEMP-RAM has a memory size of 20 kbits, the correlations of 1280 preselected start indices may be considered. Suitable monitoring and control arithmetic must be used to ensure that no more than 1280 counts exceed the first threshold value Thres during the preselection process.

The number of start indices in question for the time slot boundary is further minimized by means of the peak detector 14. For this purpose, the peak detector 14 uses a controllable threshold value to select up to 128 maximum values from the present 1280 accumulated correlation results, and stores these correlation results with the associated start indices in the result memory 8. Algorithms that can be implemented for the described purpose in the peak detector 14 have been described in the previous exemplary embodiments.

The digital signal processor 9 can access the result memory 8, and can calculate the time slot boundary with relatively little computation effort from the correlation results stored there.

After completion of the time slot synchronization process, the computation operations required for frame synchronization are carried out at the defined time slot boundaries. In this case, starting at a time slot boundary, 256 sample values are multiplied position-wise by the sequence z in the matched filter 3. Since the oversampling rate factor is two, it must be remembered during the selection of the 256 sample values used for this purpose that only every alternate sample value is considered in the sequence of sample values. The sum of in each case 16 successive multiplication results is then formed. This in each case corresponds to a correlation of the sample values with the sequence b, which is based on the sequence z. In this case, it is necessary to take into account the mathematical sign +1 or −1 by which the sequence b is multiplied as a function of its position in the sequence z. Overall, in consequence, this results in 16 complex-value correlation values for each time slot. 16 bits of memory space are in each case provided in the buffer store MASK-RAM for the real part and the imaginary part of a correlation value. The intermediate results for a time slot accordingly require a memory space of 2·16·16 bits=512 bits in the buffer store MASK-RAM. The intermediate results for 6 time slot boundaries can be stored at the same time in the buffer store MASK-RAM.

The intermediate results that are stored in the buffer store MASK-RAM are read time slot by time slot to the frame synchronization data path 6, where they are processed further. The intermediate results for a time slot are subjected to fast Hadamard transformations in the fast Hadamard transformation unit 19. For each processed time slot boundary, this once again results in a sequence of 16 values, with a word length of 16 bits each. These 16 values are used in the identification unit 18 in order to identify the base station that is transmitting the frame synchronization codes, and to detect the start of a frame.

At least 3 time slots must be processed in the frame synchronization data path 6 for unambiguous identification of a base station and of the frame boundary. As a rule, the intermediate results from 15 time slots are used for this purpose.

In order to further improve the detection probability, averaging over a number of frames is advantageous. For this purpose, the results of the fast Hadamard transformations are temporarily stored in the buffer store TEMP-RAM. The procedure described above means that the frame synchronization data path 6 is able to use 3 to 15 successive time slots for frame synchronization and to average each of these time slots, in synchronism with the time slots, over up to 3 frames. In the present exemplary embodiment, the buffer store TEMP-RAM is matched to the frame synchronization, and is provided with a memory size of 22.5 kbits. 6 time slot boundaries can thus be processed at the same time by the frame synchronization data path 6 (6·16·15 time slots·16 bits).

The controller for the arrangement 1 illustrated in FIG. 15 is formed by the digital signal processor 9. The digital signal processor 9 programs the units shown in FIG. 15 for their task elements. In particular, the digital signal processor 9 sets the synchronization mode, the number of averaging processes, and the threshold values.

The buffer stores TEMP-RAM and MASK-RAM as well as the result memories 7 and 8 are each duplicated in the present exemplary embodiment. This has the advantage that, in the event of an interruption in a first synchronization process, for example in order to start a second synchronization process at a different frequency, the first synchronization process can be continued after the interruption, and need not be restarted again. The same applies to the second synchronization process.

FIG. 15 shows the buffer stores TEMP-RAM and MASK-RAM as independent buffer stores. However, it is not absolutely essential for the buffer stores TEMP-RAM and MASK-RAM to be implemented as physically independent memories. In fact, the two buffer stores TEMP-RAM and MASK-RAM may be contained in a common memory, with the common memory being appropriately partitioned.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

We claim:

1. A method for synchronization of a mobile radio receiver having a time slot structure for a radio signal by finding a specific time slot boundary, which is received from a base station, comprising:

receiving a data stream at the mobile radio receiver;

filtering the data stream, thereby resulting a decision sequence of values associated with the received data as a set of possible time slot boundaries; and processing the decision sequence further, the processing comprising:

selecting a subset of the decision sequence values using statistical characteristics of signal sample values that are associated with one of the time slot boundaries, and signal sample values that are not associated with one of the time slot boundaries; and averaging the elements of the associated sample values of the subset over time, wherein the specific time slot boundary is obtained as a result of the averaging.

2. The method of claim 1, wherein selecting the subset of the decision sequence comprises taking into account a received overall spectrum of the radio signal, taking into account statistical characteristics of an interference signal associated with the radio signal, or taking into account a predetermined minimum power to be detected in one path associated with the radio signal.

3. The method of claim 1, wherein selecting the subset of the decision sequence comprises including only received data items in the subset having values that exceed a specific first threshold value (Thres).

4. The method of claim 3, wherein the first threshold value (Thres) is determined by means of the following equation:

$$\text{Thres} = Q_{1-\alpha,2},$$

where $Q_{1-\alpha,2}$ is the quantil of order $1-\alpha$ in the distribution function $$f_{Y_{i>1}}(y) = \frac{1}{\sigma^2} e^{\frac{y}{\sigma^2}}; \sigma^2 = \sigma_I^2 + \sigma_Q^2$$

in which $\sigma_I^2$ is the interference energy in the I-phase branch and $\sigma_Q^2$ is the interference energy in the Q-phase branch, and where:

$$1 - \alpha = \int_{Thres}^{\infty} f_{Y_{i>1}}(y) dy = 1 - \int_0^{Thres} f_{Y_{i>1}}(y) dy,$$

where the index $i>1$ denotes those signal sample values that are not associated with the time slot boundary, and where $f_{y_{i>1}}(y)$ describes the density function of a central $x^{2-}$ distribution with two degrees of freedom.

5. The method of claim 1, wherein at least two time slots are taken into account for the processing in the selecting the subset of the decision sequence.

6. The method of claim 5, wherein selecting the subset of the decision sequence comprises including only received data items in the subset that fall in a predetermined basic result class.

7. The method of claim 6, wherein if the subset selected as the target class exceeds the memory space available for storage of the last-mentioned subset, switching the target class to the next-higher basic result class.

8. The method of claim 7, wherein if the subset selected as the target class, or if the subset is modified by switching to the next-higher basic result class, does not completely fill a memory space available for storage of the subset, a remaining portion of the memory space is filled with values from the next-lower result class with randomly selected index numbers.

9. The method of claim 8, wherein indices of the values that are used for filling the remaining portion of the memory space are distributed uniformly.

10. The method of claim 1, wherein the averaging comprises hard averaging, wherein a positive threshold value overshoot of the elements in the subset with respect to a second threshold value (Thres2$_{hard}$) are registered.

11. The method of claim 10, wherein after the averaging process, only the greatest result value of the elements in the subset is selected for further processing.

12. The method of claim 11, wherein the second threshold value (Thres2$_{hard}$) is set such that a false detection rate resulting from the equation:

$$P[y_{i=1} < y_{i>1}] = P[y_{i=1} - y_{i>1} < 0]$$

based on $$P(x < 0) = \int_{-\infty}^{0} f_x(y) dy$$
$$= \int_{-\infty}^{0} f_{Y_{i=1}}(y) + f_{Y_{i>1}}(-y) dy$$
$$= \int_{-\infty}^{0} \text{conv}[f_{Y_{i=1}}(y), f_{Y_{i>1}}(-y)] dy$$

has a minimum at a predetermined $E_{pSCH_c}/I_0$ value, where $E_{pSCH_c}$ is the received energy per chip of the primary synchronization channel, and $I_0$ is the total received power.

13. The method of claim 10, wherein after the time averaging process, only the n largest result values of the elements in the subset are selected for further processing, where n is a natural number.

14. The method of claim 13, wherein n is equal to 128.

15. The method of claim 1, wherein the averaging process comprises a soft averaging process.

16. The method of claim 15, wherein after the time averaging process, selecting for further processing only those elements in the subset having result values that exceed a second threshold value (Thres2$_{soft}$).

17. The method of claim 16, wherein the second threshold value (Thres2$_{soft}$) is set taking into account a predetermined $E_{pSCH_c}/I_0$ value, where $E_{pSCH_c}$ is the received energy per chip of the primary synchronization channel, and $I_0$ is the total received power.

18. The method of claim 17, wherein the second threshold value (Thres2$_{soft}$) is set with the assistance of a table in which $E_{pSCH_c}/I_0$ values are associated with values of the second threshold value.

19. The method of claim 1, wherein at the start of each time slot, the base station transmits a time slot synchronization code in the radio signal which is known in the mobile radio receiver and comprises a sequence of chips, and wherein the decision sequence is obtained from correlations between the time slot synchronization codes received by the mobile radio receiver in the radio signal and the known time slot synchronization code.

20. The method of claim 1, further comprising synchronizing a mobile radio receiver having a frame structure for a radio signal which is received from a base station, with the time slot boundaries of the radio signal previously having been determined, comprising:
   filtering a data stream which has been received by the mobile radio receiver in a filter taking into account the previously determined time slot boundaries, and, after the filtering process, producing a predetermined number of values for each time slot boundary; and
   calculating the frame boundary for synchronization from the produced values.

21. The method of claim 20, wherein in each frame, the base station transmits a sequence of frame synchronization codes, which is known in the mobile radio receiver, which each have a sequence of chips, with a frame synchronization code at the start of each time slot, and wherein the values are produced from correlations between the frame synchronization codes received by the mobile radio receiver and a basic sequence on which the known frame synchronization codes are based.

22. The method of claim 21, wherein the correlations begin with the start of a time slot.

23. The method of claim 20, wherein the frame boundary is calculated by means of a fast Hadamard transformation.

24. The method of claim 23, further comprising averaging the results of the fast Hadamard transformations for each time slot over two or more frame lengths.

25. A device for synchronization of a mobile radio receiver with a radio signal, which is received from a base station, and has a time slot structure and a frame structure associated therewith, comprising:
- a filter configured to filter a data stream received by the mobile radio receiver, wherein the filtered data stream comprises a decision sequence;
- a first rewritable memory and a second rewritable memory;
- a preselection unit configured to select a subset of the decision sequence based on statistical characteristics of signal sample values associated with a time slot boundary and signal sample values that are not associated with a time slot boundary, and further configured to save the subset of the decision sequence in the first rewritable memory;
- an averaging unit configured to receive the subset of the decision sequence from the first rewritable memory, average the elements of the associated sample value of the subset, and determine the time slot boundary based thereon.

26. The device of claim 25, wherein the filter comprises a correlator unit or a matched filter configured to correlate a received synchronization code in the data stream of the radio signal and a known synchronization code.

27. The device of claim 25, wherein the preselection unit comprises a threshold value decision maker unit configured to compare correlation values to a threshold, an incrementer unit configured to increment a count if the correlation values exceed the threshold, and store the count in the second rewritable memory, and a unit for calculation of statistical variables.

28. The device of claim 25, further comprising a peak detection unit configured to determine selected data items from a data set from the averaging unit that overshoot an adjustable threshold value.

29. The device of claim 28, further comprising a third rewritable memory configured to temporarily store the results determined by the peak detection unit.

30. The device of claim 25, further comprising a calculation unit that receives the decision sequence results and performs fast Hadamard transformations thereon.

31. The device of claim 30, further comprising an identification unit configured to determine a frame boundary based on the transformations.

32. The device of claim 31, further comprising a control unit configured to control the filter, the first and the second rewritable memories, the preselection unit, the peak detection unit, and the unit for carrying out fast Hadamard transformations.

* * * * *

UNITED STATES PATENT AND TRADEMARK OFFICE
CERTIFICATE OF CORRECTION

PATENT NO. : 7,499,473 B2
APPLICATION NO. : 11/076210
DATED : March 3, 2009
INVENTOR(S) : Burkhard Becker et al.

It is certified that error appears in the above-identified patent and that said Letters Patent is hereby corrected as shown below:

Column 11, equation 19; Please replace
"
$$f_{Y_{i=1}}(y) = \frac{1}{\sigma^2} e^{-\frac{s^2+y}{\sigma^2}} I_0\left(\sqrt{y}\frac{2s}{\sigma^2}\right); \sigma^2 = \sigma_I^2 + \sigma_Q^2 \qquad (19)$$
"

with
--

$$fy_{i=1}(y) = \frac{1}{\sigma^2} e^{\frac{s^2+y}{\sigma^2}} I_0\left(\sqrt{y}\frac{2s}{\sigma^2}\right); \sigma^2 = \sigma_Q^2 + \sigma_Q^2 \qquad (19)$$

Column 12, example 1; Please replace
"
$$N1=5, k03, L=5120, M=1400 \text{ --- } p\ ?$$

$$\frac{1400}{5120} = \sum_{k=3}^{5}\binom{5}{k}p^k(1-p)^{5-k} = 0.2734$$
"

from equation (21), equation (22)

with
--

```
N1 = 5, k0 = 3, L = 5120, M = 1400    ---> p ?
```

1.
$$\frac{1400}{5120} = \sum_{k=3}^{5}\binom{5}{k}p^k(1-p)^{5-k} = 0.2734$$

--

UNITED STATES PATENT AND TRADEMARK OFFICE
CERTIFICATE OF CORRECTION

PATENT NO. : 7,499,473 B2
APPLICATION NO. : 11/076210
DATED : March 3, 2009
INVENTOR(S) : Burkhard Becker et al.

It is certified that error appears in the above-identified patent and that said Letters Patent is hereby corrected as shown below:

from equation (21), equation (22)

Column 12, line 67; Please replace "1 - $\alpha$ = P[$y_{i>1}$Thres]." with --1 - $\alpha$ = P[$y_{i>1}$>Thres].--

Column 13, line 26; Please replace "2. Set Thres = $|YY|^2_{Th}$ (quantil)" with
--2. Set Thres = $|YY|^2_{Th}$ (quantil).--

Column 14, example 1; Please replace "1. Memory high = M + 10% M = 1540 words%, switch to (k0 + 1) class"

with

--1. Memory high = M + 10% · M = 1540 words%, switch to (k0 + 1) class--

Column 15, equation 28; Please replace
"
$$P[y_{i=1} < y_{i>1}] = p[y_{i=1} - y_{i>1} < 0] \qquad (28)$$
"

with
--
$$P[y_{i=l} < y_{i>l}] = P[y_{i=l} - y_{i>l} < 0] \qquad (28)$$
--

Column 15, equation 29; Please replace
"
$$\begin{aligned} P(x<0) &= \int_{-\infty}^{0} f_x(y)dy \qquad (29) \\ &= \int_{-\infty}^{0} f_{Y_{i<1}}(y) + f_{Y_{i>1}}(-y)dy \\ &= \int_{-\infty}^{0} conv[f_{Y_{i=1}}(y), f_{Y_{i>1}}(-y)]dy \end{aligned}$$

UNITED STATES PATENT AND TRADEMARK OFFICE
CERTIFICATE OF CORRECTION

PATENT NO.       : 7,499,473 B2
APPLICATION NO.  : 11/076210
DATED            : March 3, 2009
INVENTOR(S)      : Burkhard Becker et al.

It is certified that error appears in the above-identified patent and that said Letters Patent is hereby corrected as shown below:

with
--

$$P(x<0) = \int_{-\infty}^{0} f_x(y)dy$$

$$= \int_{-\infty}^{0} f_{Y_{i-1}}(y) + f_{Y_{i-1}}(-y)dy \qquad (29)$$

$$= \int_{-\infty}^{0} conv[f_{Y_{i-1}}(y), f_{Y_{i-1}}(-y)]dy$$

--

Column 15, line 62; Please replace
" $E_{pSCH_a}/I_0$ "

with
-- $E_{pSCH_c}/I_0$ --

Column 16, equation 30; Please replace
" $F2_{Rej} = (M-1)P[x<0] \qquad (30)$ "

with
-- $F2_{Rej} = (M-1)P[x<0] \qquad (30)$ --

UNITED STATES PATENT AND TRADEMARK OFFICE
CERTIFICATE OF CORRECTION

PATENT NO.       : 7,499,473 B2
APPLICATION NO.  : 11/076210
DATED            : March 3, 2009
INVENTOR(S)      : Burkhard Becker et al.

It is certified that error appears in the above-identified patent and that said Letters Patent is hereby corrected as shown below:

Column 16, line 29; Please replace "+2 dB" with --±2 dB--

Column 16, line 60; Please replace "PSCH" with --pSCH--

Column 25, claim 25, line 23; Please replace "value" with --values--

Signed and Sealed this

Twenty-eighth Day of April, 2009

JOHN DOLL
*Acting Director of the United States Patent and Trademark Office*